(12) United States Patent
Lu

(10) Patent No.: US 10,275,488 B1
(45) Date of Patent: *Apr. 30, 2019

(54) INCREMENTAL COVARIANCE CALCULATION FOR BIG DATA OR STREAMED DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 450 days.

This patent is subject to a terminal disclaimer.

(21) Appl. No.: 14/964,539

(22) Filed: Dec. 9, 2015

Related U.S. Application Data

(60) Provisional application No. 62/089,254, filed on Dec. 9, 2014.

(51) Int. Cl.
*G06F 17/18* (2006.01)
*G06F 17/30* (2006.01)
*H04L 29/08* (2006.01)

(52) U.S. Cl.
CPC ........ *G06F 17/30442* (2013.01); *G06F 17/18* (2013.01); *H04L 67/1095* (2013.01)

(58) Field of Classification Search
CPC ......... G06F 17/30463; G06F 17/30306; G06F 17/30395
USPC ........................................................ 707/719
See application file for complete search history.

(56) References Cited

U.S. PATENT DOCUMENTS

| 7,487,193 | B2 * | 2/2009 | Srinivasan ............ G06F 17/147 708/400 |
| 7,747,413 | B2 | 6/2010 | Ramsey et al. |
| 7,840,377 | B2 | 11/2010 | Ramsey et al. |
| 9,069,726 | B2 | 6/2015 | Lu |
| 2005/0256916 | A1 * | 11/2005 | Srinivasan ............ G06F 17/147 708/400 |
| 2014/0164456 | A1 * | 6/2014 | Lu .......................... G06F 17/18 708/200 |

FOREIGN PATENT DOCUMENTS

| WO | WO-2014093540 A2 | 6/2014 |
| WO | WO-2014093540 A3 | 9/2014 |

* cited by examiner

*Primary Examiner* — Jean B Fleurantin

(57) ABSTRACT

The present invention extends to methods, systems, and computing system program products for incrementally calculating covariance for Big Data or streamed data. Embodiments of the invention include incrementally calculating one or more components of a covariance for two modified computation subsets based on one or more components of the covariance calculated for two previous computation subsets and then calculating covariance based on the incrementally calculated components. Incrementally calculating the components of a covariance avoids visiting all data elements in the modified computation subsets and performing redundant computations thereby increasing calculation efficiency, saving computing resources and reducing computing system's power consumption.

20 Claims, 33 Drawing Sheets

The Definitions of Covariance:

Suppose computation subset $X$ composes of $n$ data elements: $X = \{x_i | i = 1, ..., n\}$ and computation subset $Y$ composes of $n$ data elements: $Y = \{y_i | i = 1, ..., n\}$.

Define the sum of $X$ with size $n$ in the $k^{th}$ iteration respectively as below:

$$XS_k = x_1 + x_2 + x_3 + \cdots + x_n = \sum_1^n x_i \qquad \frown\!\!\smile 401$$

Define the sum of $Y$ with size $n$ in the $k^{th}$ iteration respectively as below:

$$YS_k = y_1 + y_2 + y_3 + \cdots + y_n = \sum_1^n y_i \qquad \frown\!\!\smile 402$$

Define the mean of $X$ with size $n$ in the $k^{th}$ iteration as below:

$$\bar{x}_k = \frac{(x_1+x_2+x_3+\cdots+x_n)}{n} = \frac{\sum_1^n x_i}{n} \qquad \frown\!\!\smile 403$$

Define the mean of $Y$ with size $n$ in the $k^{th}$ iteration as below:

$$\bar{y}_k = \frac{(y_1+y_2+y_3+\cdots+y_n)}{n} = \frac{\sum_1^n y_i}{n} \qquad \frown\!\!\smile 404$$

The sample covariance of $X$ with size $n$ and $Y$ with size $n$ in the $k^{th}$ iteration is defined as:

$$Cov_s(X,Y)_k = \frac{1}{n-1}\sum_1^n (x_i - \bar{x}_k)(y_i - \bar{y}_k) \qquad \frown\!\!\smile 405$$

The population covariance of $X$ with size $n$ and $Y$ with size $n$ in the $k^{th}$ iteration is defined as:

$$Cov_p(X,Y)_k = \frac{1}{n}\sum_1^n (x_i - \bar{x}_k)(y_i - \bar{y}_k) \qquad \frown\!\!\smile 406$$

Fig. 4A

Suppose the covariance of the two computation subsets needs to be calculated again after a new data element $x_a$ is added to $X$ and a new data element $y_a$ is added to $Y$.

Define the sum of the adjusted $X$ with size $n + 1$ in the k+1$^{th}$ iteration as below:

$$XS_{k+1} = x_1 + x_2 + x_3 + \cdots + x_n + x_a = \sum_1^n x_i + x_a \qquad \frown\!\!\smile 407$$

Define the mean of the adjusted $Y'$ with size $n + 1$ in the k+1$^{th}$ iteration as below:

$$YS_{k+1} = y_1 + y_2 + y_3 + \cdots + y_n + y_a = \sum_1^n y_i + y_a \qquad \frown\!\!\smile 408$$

Define the mean of the adjusted $X$ with size $n + 1$ in the k+1$^{th}$ iteration as below:

$$\bar{x}_{k+1} = \frac{(x_1+x_2+x_3+\cdots+x_n+x_a)}{n+1} = \frac{\sum_1^n x_i + x_a}{n+1} \qquad \frown\!\!\smile 409$$

Define the mean of the adjusted $Y$ with size $n + 1$ in the k+1$^{th}$ iteration as below:

$$\bar{y}_{k+1} = \frac{(y_1+y_2+y_3+\cdots+y_n+y_a)}{n+1} = \frac{\sum_1^n y_i + y_a}{n+1} \qquad \frown\!\!\smile 410$$

The sample covariance of the adjusted $X$ and $Y$ with size $n + 1$ respectively in the k+1$^{th}$ iteration is defined as:

$$Cov_s(X,Y)_{k+1} = \frac{1}{n}\left(\sum_1^n (x_i - \bar{x}_{k+1})(y_i - \bar{y}_{k+1}) + (x_a - \bar{x}_{k+1})(y_a - \bar{y}_{k+1})\right) \qquad \frown\!\!\smile 411$$

The population covariance of the adjusted $X$ with size $n + 1$ and adjusted $Y$ with size $n + 1$ in the k+1$^{th}$ iteration is defined as:

$$Cov_p(X,Y)_{k+1} = \frac{1}{n+1}\left(\sum_1^n (x_i - \bar{x}_{k+1})(y_i - \bar{y}_{k+1}) + (x_a - \bar{x}_{k+1})(y_a - \bar{y}_{k+1})\right) \qquad \frown\!\!\smile 412$$

Fig. 4A Cont'd

Some Example Components of a Covariance:

- $XS_k = \sum_1^n x_i$
- $YS_k = \sum_1^n y_i$
- $\bar{x}_k = \frac{XS_k}{n} = \frac{1}{n}\sum_1^n x_i$
- $\bar{y}_k = \frac{YS_k}{n} = \frac{1}{n}\sum_1^n y_i$
- $SXY_k = \sum_1^n x_i y_i$
- $SDXY_k = \sum_1^n (x_i - \bar{x}_k)(y_i - \bar{y}_k)$
- $Cov_s(X,Y)_k = \frac{1}{n-1}\sum_1^n (x_i - \bar{x}_k)(y_i - \bar{y}_k)$ for a sample covariance
- $Cov_p(X,Y)_k = \frac{1}{n}\sum_1^n (x_i - \bar{x}_k)(y_i - \bar{y}_k)$ for a population covariance Basic Incremental Component Calculation Equations:

The sum or mean of the data elements in the data set will be used by following incremental algorithms, so put the calculation here instead of in each incremental algorithms.

According to the definitions of $XS_{k+1}$, $YS_{k+1}$, $\bar{x}_{k+1}$ and $\bar{y}_{k+1}$, they can be calculated in an incremental way:

$XS_{k+1} = n\bar{x}_k + x_a$ ⌢⌣ 413

$YS_{k+1} = n\bar{y}_k + y_a$ ⌢⌣ 414

$\bar{x}_{k+1} = \frac{XS_{k+1}}{n+1} = \frac{(n\bar{x}_k + x_a)}{n+1}$ ⌢⌣ 415

$\bar{y}_{k+1} = \frac{YS_{k+1}}{n+1} = \frac{(n\bar{y}_k + y_a)}{n+1}$ ⌢⌣ 416

Fig. 4B

Incremental Algorithm 1:

$SXY_k = \sum_1^n x_i y_i$ ⌒⌣ 417

$SXY_{k+1} = \sum_1^n x_i y_i + x_a y_a$ ⌒⌣ 418

$SXY_{k+1}$ can be calculated in an incremental way:

$SXY_{k+1} = SXY_k + x_a y_a$ ⌒⌣ 419

Sample covariance $\frac{1}{n-1}\sum_1^n (x_i - \bar{x}_k)(y_i - \bar{y}_k)$ itself is a component of sample covariance. Sample covariance can be incrementally calculated based on sample covariance in previous computation subset and the components $XS_k$ or $\bar{x}_k$, $XS_{k+1}$ or $\bar{x}_{k+1}$, $YS_k$ or $\bar{y}_k$ and $YS_{k+1}$ or $\bar{y}_{k+1}$ defined in Figure 4A and $SXY_k$ defined above.

$Cov_s(X,Y)_{k+1} = Cov_s(X,Y)_k + \frac{1}{n}\left(x_a y_a - XS_{k+1}\bar{y}_{k+1} - \frac{SXY_k}{n-1}\right) + \frac{XS_k \bar{y}_k}{n-1} = Cov_s(X,Y)_k + \frac{1}{n}\left(x_a y_a - \bar{x}_{k+1}YS_{k+1} - \frac{SXY_k}{n-1}\right) + \frac{\bar{x}_k YS_k}{n-1} = Cov_s(X,Y)_k + \frac{1}{n}\left(x_a y_a - \frac{XS_{k+1}YS_{k+1}}{n+1} + \frac{XS_k YS_k - SXY_k}{n-1}\right) = Cov_s(X,Y)_k + \frac{1}{n}\left(x_a y_a - (n+1)\bar{x}_{k+1}\bar{y}_{k+1} - \frac{SXY_k}{n-1}\right) + \frac{n\bar{x}_k \bar{y}_k}{n-1}$ ⌒⌣ 420

Population covariance $\frac{1}{n}\sum_1^n (x_i - \bar{x}_k)(y_i - \bar{y}_k)$ itself is a component of population covariance. Population covariance can be incrementally calculated based on population covariance in previous computation subset and the components $XS_k$ or $\bar{x}_k$, $XS_{k+1}$ or $\bar{x}_{k+1}$, $YS_k$ or $\bar{y}_k$ and $YS_{k+1}$ or $\bar{y}_{k+1}$ defined in Figure 4A and $SXY_k$ defined above.

$Cov_p(X,Y)_{k+1} = Cov_p(X,Y)_k + \frac{1}{n+1}\left(x_a y_a - XS_{k+1}\bar{y}_{k+1} - \frac{SXY_k}{n}\right) + \frac{XS_k \bar{y}_k}{n} = Cov_p(X,Y)_k + \frac{1}{n+1}\left(x_a y_a - \bar{x}_{k+1}YS_{k+1} - \frac{SXY_k}{n}\right) + \frac{\bar{x}_k YS_k}{n} = Cov_p(X,Y)_k + \frac{1}{n+1}\left(x_a y_a - \frac{XS_{k+1}YS_{k+1}}{n+1} - \frac{SXY_k}{n}\right) + \frac{XS_k YS_k}{n^2} = Cov_p(X,Y)_k + \bar{x}_k \bar{y}_k - \bar{x}_{k+1}\bar{y}_{k+1} + \frac{1}{n+1}\left(x_a y_a - \frac{SXY_k}{n}\right)$ ⌒⌣ 421

Fig. 4C

Incremental Algorithm 2:

$\sum_{1}^{n}(x_i - \bar{x}_k)(y_i - \bar{y}_k)$ is a component of covariance. $\sum_{1}^{n}(x_i - \bar{x}_k)(y_i - \bar{y}_k)$ can be incrementally calculated based on components $XS_k$ or $\bar{x}_k$ and $YS_k$ or $\bar{y}_k$ defined in Figure 4A.

$SDXY_k = \sum_{1}^{n}(x_i - \bar{x}_k)(y_i - \bar{y}_k)$ ⌢‿422

$SDXY_{k+1} = \sum_{1}^{n}(x_i - \bar{x}_{k+1})(y_i - \bar{y}_{k+1}) + (x_a - \bar{x}_{k+1})(y_a - \bar{y}_{k+1})$ ⌢‿423

$SDXY_{k+1}$ can be incrementally calculated using components $XS_k$ or $\bar{x}_k$ and $YS_k$ or $\bar{y}_k$:

$SDXY_{k+1} = SDXY_k + \frac{(n \cdot y_a - YS_k)(x_a - \bar{x}_k)}{(n+1)} = SDXY_k + \frac{(y_a - \bar{y}_k)(n \cdot x_a - XS_k)}{(n+1)} = SDXY_k + \frac{(y_a - YS_k/n)(x_a - XS_k/n)}{(n+1)} = SDXY_k + \frac{n(y_a - \bar{y}_k)(x_a - \bar{x}_k)}{(n+1)}$ ⌢‿424

Once $SDXY_{k+1}$ is calculated, then $Cov_s(X,Y)_{k+1} = \frac{SDXY_{k+1}}{n}$ ⌢‿425

$Cov_p(X,Y)_{k+1} = \frac{SDXY_{k+1}}{n+1}$ ⌢‿426

Fig. 4D

Incremental Algorithm 3:

Covariance is calculated based on components $XS_{k+1}$ or $\bar{x}_{k+1}$ and $YS_{k+1}$ or $\bar{y}_{k+1}$ defined in Figure 4A and $SXY_{k+1}$ defined below.

$SXY_k = \sum_1^n x_i y_i$ ⌒‿427

$SXY_{k+1} = \sum_1^n x_i y_i + x_a y_a$ ⌒‿428

$SXY_{k+1}$ can be calculated in an incremental way:

$SXY_{k+1} = SXY_k + x_a y_a$ ⌒‿429

Once $XS_{k+1}$ or $\bar{x}_{k+1}$, $YS_{k+1}$ or $\bar{y}_{k+1}$ and $SXY_{k+1}$ are calculated, then covariance can be calculated by $Cov_s(X,Y)_{k+1} = \frac{SXY_{k+1} - XS_{k+1}\bar{y}_{k+1}}{n} = \frac{SXY_{k+1} - \bar{x}_{k+1}YS_{k+1}}{n} = \frac{SXY_{k+1} - XS_{k+1}YS_{k+1}/(n+1)}{n} = \frac{SXY_{k+1} - (n+1)\bar{x}_{k+1}\bar{y}_{k+1}}{n}$ ⌒‿430

$Cov_p(X,Y)_{k+1} = \frac{SXY_{k+1} - XS_{k+1}\bar{y}_{k+1}}{n+1} = \frac{SXY_{k+1} - \bar{x}_{k+1}YS_{k+1}}{n+1} = \frac{SXY_{k+1} - XS_{k+1}YS_{k+1}/(n+1)}{n+1} = \frac{SXY_{k+1}}{n+1} - \bar{x}_{k+1}\bar{y}_{k+1}$ ⌒‿431

Fig. 4E

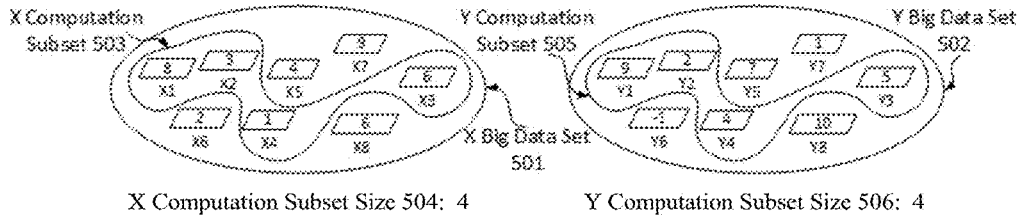

X Computation Subset Size 504: 4        Y Computation Subset Size 506: 4

Calculate Covariance for X Computation Subset 503 and Y Computation Subset 505

Traditional Algorithm:

1. Use equation 403 to calculate $\bar{x}_1$ and equation 404 to calculate $\bar{y}_1$ for the 1st iteration:

$$\bar{x}_1 = \frac{8+3+6+1}{4} = \frac{18}{4} = 4.5 \qquad \bar{y}_1 = \frac{9+2+5+4}{4} = \frac{20}{4} = 5$$

Operations in the two steps: 2 divisions, 6 additions

2. Use equation 405 to calculate $Cov_s(X,Y)_1$ for the 1st iteration:

$$Cov_s(X,Y)_1 = \frac{1}{4-1}\sum_1^4(x_i - \bar{x}_1)(y_i - \bar{y}_1) = \frac{1}{4-1}\big((8-4.5)(9-5) + (3-4.5)(2-5) +$$
$$(6-4.5)(5-5) + (1-4.5)(4-5)\big) = 7.3333333333333333$$

Operations in this step: 1 division, 4 multiplications, 3 additions, 9 subtractions There are a total of 3 divisions, 4 multiplications, 9 additions and 9 subtractions.

Fig. 5A

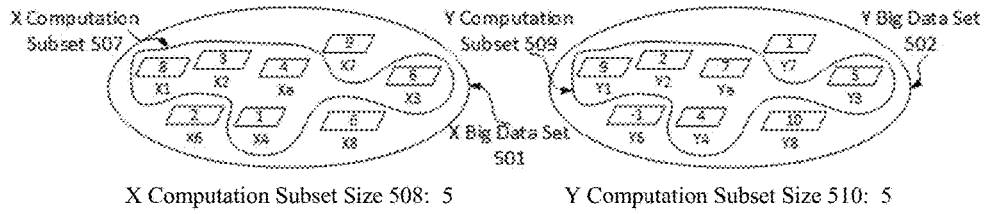

X Computation Subset Size 508: 5      Y Computation Subset Size 510: 5

Calculate Covariance for X Computation Subset 507 and Y Computation Subset 509

Traditional Algorithm:

1. Use equation 403 to calculate $\bar{x}_2$ and equation 404 to calculate $\bar{y}_2$ for the $2^{nd}$ iteration:

$$\bar{x}_2 = \frac{8+3+6+1+4}{5} = 4.4 \qquad \bar{y}_2 = \frac{9+2+5+4+7}{5} = 5.4$$

Operations in the two steps: 2 divisions, 8 additions

2. Use equation 405 to calculate $Cov_s(X,Y)_2$ for the $2^{nd}$ iteration:

$$Cov_s(X,Y)_2 = \frac{1}{5-1}\left(\sum_1^4 (x_i - \bar{x}_2)(y_i - \bar{y}_2) + (x_a - \bar{x}_2)(y_a - \bar{y}_2)\right) = \frac{1}{4}\big((8-4.4)(9-5.4) +$$
$$(3-4.4)(2-5.4) + (6-4.4)(5-5.4) + (1-4.4)(4-5.4) + (4-4.4)(7-5.4)\big) \approx 5.3$$

Operations in this step: 1 division, 5 multiplications, 4 additions, 11 subtractions There are a total of 3 divisions, 5 multiplications, 12 additions and 11 subtractions.

Fig. 5A Cont'd 1

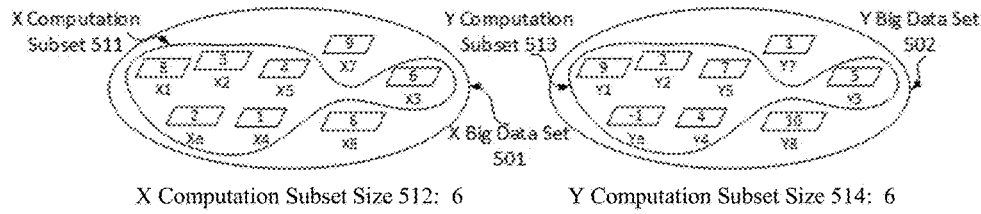

X Computation Subset Size 512: 6    Y Computation Subset Size 514: 6

Calculate Covariance for X Computation Subset 511 and Y Computation Subset 513

Traditional Algorithm:

1. Use equation 403 to calculate $\bar{x}_3$ and equation 404 to calculate $\bar{y}_3$ for the 3$^{rd}$ iteration:

$$\bar{x}_3 = \frac{8+3+6+1+4+2}{6} = 4 \qquad \bar{y}_3 = \frac{9+2+5+4+7+(-1)}{6} = 4.333333333333333$$

Operations in the two steps: 2 divisions, 10 additions

2. Use equation 405 to calculate $Cov_s(X,Y)_3$ for the 3$^{rd}$ iteration:

$Cov_s(X,Y)_3 = \frac{1}{6-1}\left(\sum_1^5(x_i - \bar{x}_3)(y_i - \bar{y}_3) + (x_a - \bar{x}_3)(y_a - \bar{y}_3)\right) = \frac{1}{5}((8-4)(9 - 4.333333333333333) + (3-4)(2 - 4.333333333333333) + (6-4)(5 - 4.333333333333333) + (1-4)(4 - 4.333333333333333) + (4-4)(7 - 4.333333333333333) + (2-4)(-1 - 4.333333333333333)) = 6.800000000000001$ Operations in this step: 1 division, 6 multiplications, 5 additions, 13 subtractions There are a total of 3 divisions, 6 multiplications, 15 additions and 13 subtractions.

Traditional algorithms for calculation covariance on $n$ data elements typically take 3 divisions, $n$ multiplications, $3(n-1)$ additions and $2n+1$ subtractions without any optimization.

Fig. 5A Cont'd 2

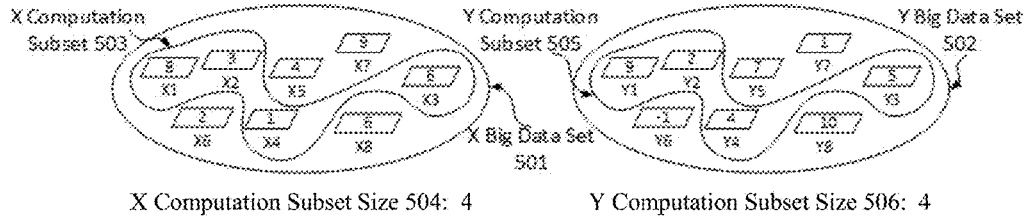

X Computation Subset Size 504: 4    Y Computation Subset Size 506: 4

Calculate Covariance for X Computation Subset 503 and Y Computation Subset 505

Incremental Algorithm 1:

1. Use equation 403 to calculate $\bar{x}_1$ and equation 404 to calculate $\bar{y}_1$ for the 1$^{st}$ iteration:

$$\bar{x}_1 = \frac{8+3+6+1}{4} = 4.5 \qquad \bar{y}_1 = \frac{9+2+5+4}{4} = 5$$

Operations in the two steps: 2 divisions, 6 additions

2. Calculate $\bar{x}_1\bar{y}_1$ for the 1$^{st}$ iteration: (keep $\bar{x}_1\bar{y}_1$ for next iteration's calculation)

$$\bar{x}_1\bar{y}_1 = 4.5 \times 5 = 22.5$$

Operations in this step: 1 multiplication

3. Use equation 417 to calculate $SXY_1$ for the 1$^{st}$ iteration:

$$SXY_1 = \sum_1^4 x_i y_i = 8 \times 9 + 3 \times 2 + 6 \times 5 + 1 \times 4 = 112$$

Operations in this step: 4 multiplications, 3 additions

4. Use equation 405 to calculate $Cov_s(X,Y)_1$ for the 1$^{st}$ iteration:

$$Cov_s(X,Y)_1 = \frac{1}{4-1}\sum_1^4(x_i - \bar{x}_1)(y_i - \bar{y}_1) = \frac{1}{4-1}\big((8 - 4.5)(9 - 5) + (3 - 4.5)(2 - 5) + (6 - 4.5)(5 - 5) + (1 - 4.5)(4 - 5)\big) = 7.3333333333333333$$

Operations in this step: 1 division, 4 multiplications, 3 additions, 9 subtractions There are a total of 3 divisions, 9 multiplications, 12 additions and 9 subtractions.

Fig. 5B

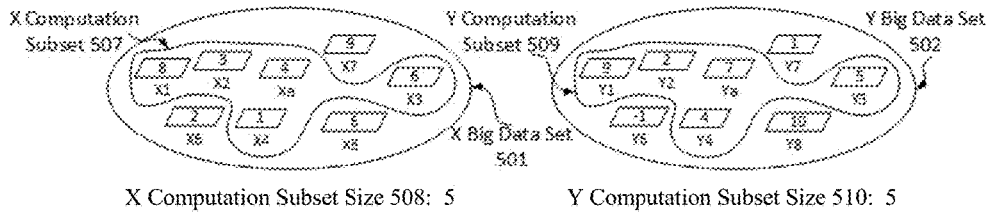

X Computation Subset Size 508: 5    Y Computation Subset Size 510: 5

Calculate Covariance for X Computation Subset 507 and Y Computation Subset 509

Incremental Algorithm 1:

1. Use equation 415 to calculate $\bar{x}_2$ and equation 416 to calculate $\bar{y}_2$ for the 2$^{nd}$ iteration:

$$\bar{x}_2 = \frac{4\bar{x}_1 + x_a}{4+1} = \frac{4 \times 4.5 + 4}{5} = 4.4 \qquad \bar{y}_2 = \frac{4\bar{y}_1 + y_a}{4+1} = \frac{4 \times 5 + 7}{5} = 5.4$$

Operations in the two steps: 2 divisions, 2 multiplications, 3 additions  (keep 4+1 value)

2. Use equation 419 to calculate $SXY_2$ for the 2$^{nd}$ iteration:

$$SXY_2 = SXY_1 + x_a y_a = 112 + 4 \times 7 = 140 \qquad \text{(keep } x_a y_a\text{)}$$

Operations in this step: 1 multiplication, 1 addition

3. Use equation 420 to calculate covariance $Cov_s(X,Y)_2$ for the 2$^{nd}$ iteration:

$$Cov_s(X,Y)_2 = Cov_s(X,Y)_1 + \frac{1}{4}\left(x_a y_a - (4+1)\bar{x}_2\bar{y}_2 - \frac{SXY_1}{(4-1)}\right) + \frac{4}{4-1}\bar{x}_1\bar{y}_1 =$$
$$7.3333333333333333 + \frac{1}{4}\left(4 \times 7 - 5 \times 4.4 \times 5.4 - \frac{112}{3}\right) + \frac{4}{3} \times 4.5 \times 5 = 5.3$$

Operations in this step: 3 divisions, 5 multiplications, 2 additions, 4 subtractions There are a total of 5 divisions, 8 multiplications, 6 additions and 4 subtractions.

Fig. 5B Cont'd 1

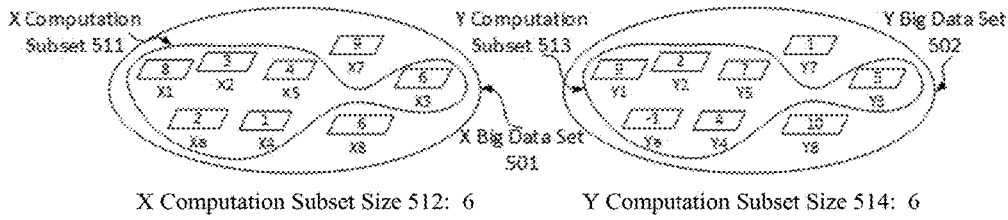

X Computation Subset Size 512: 6   Y Computation Subset Size 514: 6

Calculate Covariance for X Computation Subset 511 and Y Computation Subset 513

Incremental Algorithm 1:

1. Use equation 415 to calculate $\bar{x}_3$ and equation 416 to calculate $\bar{y}_3$ for the 3$^{rd}$ iteration:

$$\bar{x}_3 = \frac{5\bar{x}_2 + x_a}{5+1} = \frac{5 \times 4.4 + 2}{6} = 4 \qquad \bar{y}_3 = \frac{5\bar{y}_2 + y_a}{5+1} = \frac{5 \times 5.4 + (-1)}{6} = 4.3333333333333333$$

Operations in the two steps: 2 divisions, 2 multiplications, 3 additions (keep 5+1 value)

2. Use equation 419 to calculate $SXY_3$ for the 3$^{rd}$ iteration:

$$SXY_3 = SXY_2 + x_a y_a = 140 + 2 \times (-1) = 138$$

Operations in this step: 1 multiplication, 1 addition

3. Use equation 420 to calculate covariance $Cov_s(X,Y)_3$ for the 3$^{rd}$ iteration:

$$Cov_s(X,Y)_3 = Cov_s(X,Y)_2 + \frac{1}{5}\left(x_a y_a - (5+1)\bar{x}_3\bar{y}_3 - \frac{SXY_2}{(5-1)}\right) + \frac{5}{5-1}\bar{x}_2\bar{y}_2 = 5.3 + \frac{1}{5}\left(2 \times (-1) - 6 \times 4 \times 4.3333333333333333 - \frac{140}{4}\right) + \frac{5}{4} \times 4.4 \times 5.4 = 6.8000000000000002$$

Operations in this step: 3 divisions, 5 multiplications, 2 additions, 4 subtractions There are a total of 5 divisions, 8 multiplications, 6 additions and 4 subtractions.

Fig. 5B Cont'd 2

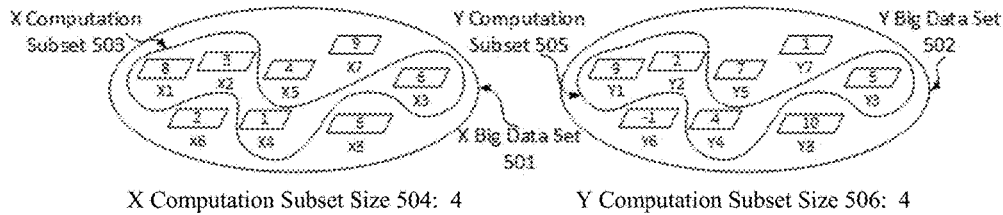

X Computation Subset Size 504: 4    Y Computation Subset Size 506: 4

Calculate Covariance for X Computation Subset 503 and Y Computation Subset 505

Incremental Algorithm 2:

1. Use equation 403 to calculate $\bar{x}_1$ and equation 404 to calculate $\bar{y}_1$ for the $1^{st}$ iteration:

$$\bar{x}_1 = \frac{8+3+6+1}{4} = 4.5 \qquad \bar{y}_1 = \frac{9+2+5+4}{4} = 5$$

Operations in the two steps: 2 divisions, 6 additions

2. Use equation 422 to calculate $SDXY_1$ for the $1^{st}$ iteration:

$$SDXY_1 = \sum_1^4 (x_i - \bar{x}_1)(y_i - \bar{y}_1) = (8 - 4.5)(9 - 5) + (3 - 4.5)(2 - 5) + (6 - 4.5)(5 - 5) + (1 - 4.5)(4 - 5) = 22$$

Operations in this step: 4 multiplications, 3 additions, 8 subtractions

3. Use equation 425 to calculate $Cov_s(X,Y)_1$ for the $1^{st}$ iteration:

$$Cov_s(X,Y)_1 = \frac{SDXY_1}{4-1} = \frac{22}{3} = 7.3333333333333333$$

Operations in this step: 1 division, 1 subtraction

There are a total of 3 divisions, 4 multiplications, 9 additions and 9 subtractions.

Fig. 5C

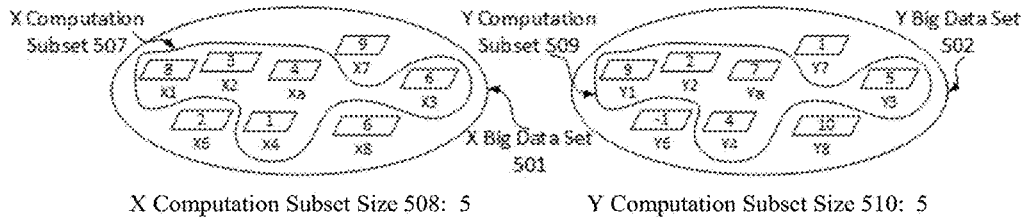

X Computation Subset Size 508: 5    Y Computation Subset Size 510: 5

Calculate Covariance for X Computation Subset 507 and Y Computation Subset 509

Incremental Algorithm 2:

1. Use equation 415 to calculate $\bar{x}_2$ and equation 416 to calculate $\bar{y}_2$ for the 2$^{nd}$ iteration:

$$\bar{x}_2 = \frac{4\bar{x}_1 + x_a}{4+1} = \frac{4 \times 4.5 + 4}{5} = 4.4 \qquad \bar{y}_2 = \frac{4\bar{y}_1 + y_a}{4+1} = \frac{4 \times 5 + 7}{5} = 5.4$$

Operations in the two steps: 2 divisions, 2 multiplications, 3 additions (keep 4+1 value)

2. Use equation 424 to calculate $SDXY_2$ for the 2$^{nd}$ iteration:

$$SDXY_2 = SDXY_1 + \frac{4(y_a - \bar{y}_1)(x_a - \bar{x}_1)}{(4+1)} = 22 + \frac{4(7-5)(4-4.5)}{5} = 21.2$$

Operations in this step: 1 division, 2 multiplications, 1 addition, 2 subtractions (use 4+1 calculated in step 1)

3. Use equation 425 to calculate covariance $Cov_s(X,Y)_2$ for the 2$^{nd}$ iteration:

$$Cov_s(X,Y)_2 = \frac{SDXY_2}{4} = \frac{21.2}{4} = 5.3$$

Operations in this step: 1 division

There are a total of 4 divisions, 4 multiplications, 4 additions and 2 subtractions.

Fig. 5C Cont'd 1

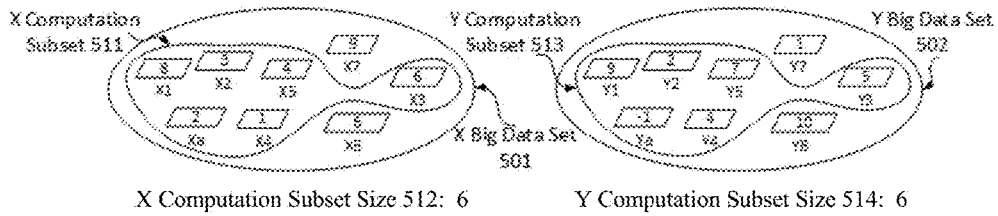

X Computation Subset Size 512: 6     Y Computation Subset Size 514: 6

Calculate Covariance for X Computation Subset 511 and Y Computation Subset 513

Incremental Algorithm 2:

1. Use equation 415 to calculate $\bar{x}_3$ and equation 416 to calculate $\bar{y}_3$ for the 3$^{rd}$ iteration:

$$\bar{x}_3 = \frac{5\bar{x}_2 + x_a}{5+1} = \frac{5 \times 4.4 + 2}{6} = 4 \qquad \bar{y}_3 = \frac{5\bar{y}_2 + y_a}{5+1} = \frac{5 \times 5.4 + (-1)}{6} = 4.3333333333333333$$

Operations in the two steps: 2 divisions, 2 multiplications, 3 additions (keep 5+1 value)

2. Use equation 424 to calculate covariance $SDXY_3$ for the 3$^{rd}$ iteration:

$$SDXY_3 = SDXY_2 + \frac{5(y_a - \bar{y}_2)(x_a - \bar{x}_2)}{(5+1)} = 21.2 + \frac{5(-1-5.4)(2-4.4)}{6} = 34$$

Operations in this step: 1 division, 2 multiplications, 1 addition, 2 subtractions (use 5+1 calculated in step 1)

3. Use equation 425 to calculate covariance $Cov_s(X,Y)_3$ for the 3$^{rd}$ iteration:

$$Cov_s(X,Y)_3 = \frac{SDXY_3}{5} = \frac{34}{5} = 6.8$$

Operations in this step: 1 division

There are a total of 4 divisions, 4 multiplications, 4 additions and 2 subtractions.

Fig. 5C Cont'd 2

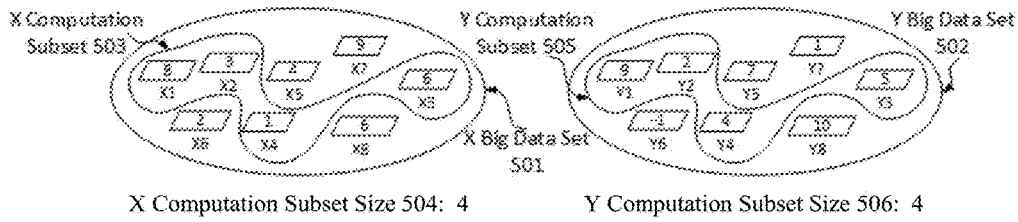

X Computation Subset Size 504: 4    Y Computation Subset Size 506: 4

Calculate Covariance for X Computation Subset 503 and Y Computation Subset 505

Incremental Algorithm 3:

1. Use equation 403 to calculate $\bar{x}_1$ and equation 404 to calculate $\bar{y}_1$ for the 1$^{st}$ iteration:

$$\bar{x}_1 = \frac{8+3+6+1}{4} = 4.5 \qquad \bar{y}_1 = \frac{9+2+5+4}{4} = 5$$

Operations in the two steps: 2 divisions, 6 additions

2. Use equation 427 to calculate $SXY_1$ for the 1$^{st}$ iteration:

$$SXY_1 = \sum_1^4 x_i y_i = 8 \times 9 + 3 \times 2 + 6 \times 5 + 1 \times 4 = 112$$

Operations in this step: 4 multiplications, 3 additions

3. Use equation 430 to calculate $Cov_s(X,Y)_1$ for the 1$^{st}$ iteration:

$$Cov_s(X,Y)_1 = \frac{SXY_1 - 4\bar{x}_1\bar{y}_1}{4-1} = \frac{112 - 4 \times 4.5 \times 5}{3} = 7.3333333333333333$$

Operations in this step: 1 division, 2 multiplications, 2 subtractions

There are a total of 3 divisions, 6 multiplications, 9 additions and 2 subtractions.

Fig. 5D

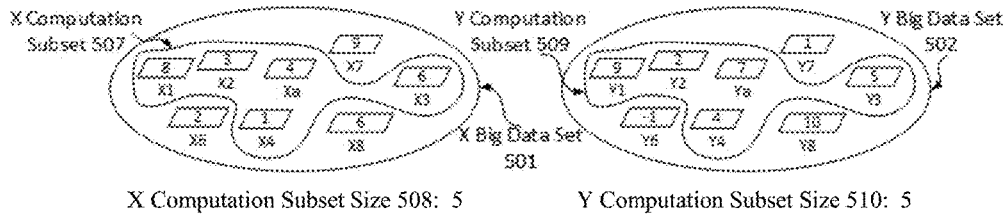

X Computation Subset Size 508: 5   Y Computation Subset Size 510: 5

Calculate Covariance for X Computation Subset 507 and Y Computation Subset 509

Incremental Algorithm 3:

1. Use equation 415 to calculate $\bar{x}_2$ and equation 416 to calculate $\bar{y}_2$ for the 2$^{nd}$ iteration:

$$\bar{x}_2 = \frac{4\bar{x}_1 + x_a}{4+1} = \frac{4 \times 4.5 + 4}{5} = 4.4 \qquad \bar{y}_2 = \frac{4\bar{y}_1 + y_a}{4+1} = \frac{4 \times 5 + 7}{5} = 5.4$$

Operations in the two steps: 2 divisions, 2 multiplications, 3 additions (keep 4+1 value)

2. Use equation 429 to calculate $SXY_2$ for the 2$^{nd}$ iteration:

$SXY_2 = SXY_1 + x_a y_a = 112 + 4 \times 7 = 140$

Operations in this step: 1 multiplication, 1 addition

3. Use equation 430 to calculate $Cov_s(X,Y)_2$ for the 2$^{nd}$ iteration:

$$Cov_s(X,Y)_2 = \frac{SXY_2 - (4+1)\bar{x}_2 \bar{y}_2}{4} = \frac{140 - 5 \times 4.4 \times 5.4}{4} = 5.3$$

Operations in this step: 1 division, 2 multiplications, 1 subtraction (use 4+1 calculated in step 1)

There are a total of 3 divisions, 5 multiplications, 4 additions and 1 subtraction.

Fig. 5D Cont'd 1

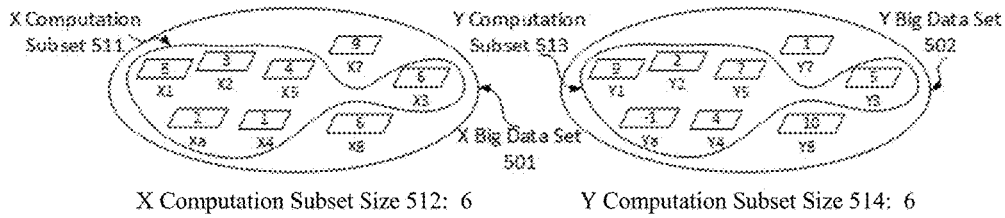

X Computation Subset Size 512: 6          Y Computation Subset Size 514: 6

<u>Calculate Covariance for X Computation Subset 511 and Y Computation Subset 513</u>

Incremental Algorithm 3:

1. Use equation 415 to calculate $\bar{x}_3$ and equation 416 to calculate $\bar{y}_3$ for the 3$^{rd}$ iteration:

$$\bar{x}_3 = \frac{5\bar{x}_2 + x_a}{5+1} = \frac{5 \times 4.4 + 2}{6} = 4 \qquad \bar{y}_3 = \frac{5\bar{y}_2 + y_a}{5+1} = \frac{5 \times 5.4 + (-1)}{6} = 4.3333333333333333$$

Operations in the two steps: 2 divisions, 2 multiplications, 3 additions (keep 5+1 value)

2. Use equation 429 to calculate $SXY_3$ for the 3$^{rd}$ iteration:

$$SXY_3 = SXY_2 + x_a y_a = 140 + 2 \times (-1) = 138$$

Operations in this step: 1 multiplication, 1 addition

3. Use equation 430 to calculate $Cov_s(X,Y)_3$ for the 3$^{rd}$ iteration:

$$Cov_s(X,Y)_3 = \frac{SXY_3 - (5+1)\bar{x}_3\bar{y}_3}{5} = \frac{138 - 6 \times 4 \times 4.3333333333333333}{5} = 6.8000000000000002$$

Operations in this step: 1 division, 2 multiplications, 1 subtraction (use 5+1 calculated in step 1)

There are a total of 3 divisions, 5 multiplications, 4 additions and 1 subtraction.

Fig. 5D Cont'd 2

|  | Division | Multiplication | Addition | Subtraction |
|---|---|---|---|---|
| Traditional Algorithm | 3 | 6 | 15 | 13 |
| Incremental Algorithm 1 | 5 | 8 | 6 | 4 |
| Incremental Algorithm 2 | 4 | 4 | 4 | 2 |
| Incremental Algorithm 3 | 3 | 5 | 4 | 1 |

|  | Division | Multiplication | Addition | Subtraction |
|---|---|---|---|---|
| Traditional Algorithm | 3 | 1,000,000 | 2,999,997 | 2,000,001 |
| Incremental Algorithm 1 | 5 | 8 | 6 | 4 |
| Incremental Algorithm 2 | 4 | 4 | 4 | 2 |
| Incremental Algorithm 3 | 3 | 5 | 4 | 1 |

INCREMENTAL COVARIANCE CALCULATION FOR BIG DATA OR STREAMED DATA USING COMPONENTS

CROSS-REFERENCE TO RELATED APPLICATIONS

This application claims the benefit of provisional patent application Ser. No. 62/089,254, filed 2014 Dec. 9 by the present inventor.

BACKGROUND AND RELEVANT ART

Internet, mobile communications, navigation, online gaming, sensing technologies and large scale computing infrastructures have produced huge amount of data sets every day. Big Data is data that is beyond the processing capacity of conventional database systems and analyzing capacity of traditional analyzing methods due to its huge volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Streamed data is data that is constantly being received by a receiver while being delivered by a provider. Streamed data may be real-time data gathered from sensors and continuously transferred to computing devices or electronic devices. Often this includes receiving similarly formatted data elements in succession separated by some time interval. Streamed data may also be data continuously read from storage devices, e.g., storage devices on multi-computing devices which store a Big Data set. Stream processing becomes one of the focused research areas due to the following reasons. One reason is that the input data are coming too fast to store entirely for batch processing, so some analysis have to be performed when the data streams in. The second reason is that immediate responses to any changes of the data are required in some application domains, e.g., mobile related applications, online gaming, navigation, real-time stock analysis and automated trading, etc. The third reason is that some applications or electronic devices require streaming processing due to their nature, e.g., audio, video and digital TV, etc.

Processing streamed data may include performing calculations on multiple data elements. Thus, a computing device receiving a stream of data elements typically includes a buffer so that some number of data elements may be stored. Processing the streamed data elements may include accessing data elements stored in the buffer. When performing statistical calculations on streamed data elements, buffer requirements may be quite large. For example, when calculating covariance a (potentially large) number of data elements may need to be accessed.

In addition, algorithms on streamed data processing may be extended to Big Data processing, because Big Data sets are accumulated over time and they may be considered as data streams with irregular time intervals.

For Big data set or streamed data processing, some statistical calculations are recalculated as a Big Data set is changed or streamed data elements are received. Thus, the (potentially large) number of data elements may be repeatedly accessed. For example, it may be that a covariance is calculated for two computation subsets each with n data elements in one data stream respectively and the two computation subsets keep growing with new streamed data coming. As such, when a pair of data elements (one data element from each data stream) is accessed or received, each element is added to the corresponding computation subset respectively. All 2n+2 data elements in the two computation subsets are then accessed to recalculate the covariance.

When performing a covariance calculation on all 2n+2 data elements all the 2n+2 data elements in the two computation subsets will be visited and used. As such, each data element in the two computation subsets needs to be accessed for recalculating the covariance whenever there is a change in the two computation subsets. Depends on necessity, the computation subset size n may be extremely large, so the data elements in a computation subset may be distributed over a cloud comprising hundreds of thousands of computing devices. Re-performing covariance calculations on Big Data or streamed data elements in traditional way results in slow response and significant waste of computing resources.

BRIEF SUMMARY

The present disclosure describes methods, systems, and computing system program products for incrementally calculating a covariance for Big Data or streamed data. A computing system comprises one or more computing devices. Each of the computing devices comprises one or more processors. The computing system comprises one or more storage media. The computing system has stored one or two data sets on the one or more storage media or has access to one or two data streams. The computing system maintains a computation subset size counter. The computation subset size counter indicates the number of pairs of data elements in two computation subsets of the one or two data sets or the one or two data streams. Embodiments of the invention include incrementally calculating one or more components of a covariance for two modified computation subsets based on one or more components calculated for the two previous computation subsets and then calculating the covariance for the two modified computation subsets based on one or more of the incrementally calculated components. Incrementally calculating covariance not only avoids visiting all the data element in the two computation subsets but also avoids storing the whole computation subsets as traditional algorithms would do, and thus improves the calculation efficiency, saves computing resources and reduces computing system's power consumption. The computing system may also optionally include one or two data buffers for storing accessed or received data elements.

The computing system initializes a computation subset size counter and one or more components of a covariance for two computation subsets of the one or two data sets or one or two data streams.

The computing system accesses or receives a pair of Big Data or streamed data elements to be added to the two computation subsets.

The computing system stores the accessed or received pair of data elements into one or two optional data buffers as needed.

The computing system modifies the two computation subsets by adding the accessed or received pair of data elements to the two computation subsets and modifies the computation subset size by increasing its value by 1.

The computing system incrementally calculates one or more components of a covariance for the modified two computation subsets. The computing system calculates a covariance as needed based on one or more incrementally calculated components, i.e., a covariance may be calculated after multiple pairs of data elements are accessed or received instead of just one pair of data elements being accessed or received.

The computing system directly incrementally calculates $v(1 \le v \le p)$ components of a covariance for the modified computation subsets based on v components for the previous computation subsets. Directly incrementally calculating v components of a covariance includes directly incrementally calculating each of the v components one by one. Directly incrementally calculating a component of a covariance includes accessing the component calculated for the prior computation subset. Directly incrementally calculating a component of a covariance includes adding a contribution of the added pair of data elements to the component mathematically.

The computing system indirectly incrementally calculates $w=p-v$ components of a covariance for the modified computation subsets as needed. Indirectly incrementally calculating the w components includes indirectly incrementally calculating each of the w components one by one. Indirectly incrementally calculating a component includes calculating the component based on one or more components other than the component itself. The one or more components may have been initialized, directly incrementally calculated or indirectly incrementally calculated.

The computing system generates a covariance, either a sample covariance or a population covariance, as needed based on one or more incrementally calculated components of a covariance.

The computing system may keep accessing or receiving a pair of data elements to be added to the two computation subsets, modifying the computation subsets and the computation subset size counter, incrementally calculating one or more components and generating a covariance (either a sample covariance or a population covariance) as needed using one or more incrementally calculated components, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of a covariance and traditional equations for calculating a covariance on two computation subsets.

FIG. 4B illustrates some components of a covariance, which may be used for incrementally calculating the covariance on two computation subsets.

FIG. 4C illustrates the first example incremental algorithm (incremental algorithm 1) and its equations for incrementally calculating a sample covariance and a population covariance based on incrementally calculated components $XS_k$ or $\bar{x}_k$, $XS_{k+1}$ or $\bar{x}_{k+1}$, $YS_k$ or $\bar{y}_k$, $YS_{k+1}$ or $\bar{y}_{k+1}$, and $SXY_k$.

FIG. 4D illustrates the second example incremental covariance calculation algorithm (incremental algorithm 2) and its equations for incrementally calculating a sample variance and a population variance respectively on two computation subsets based on incrementally calculated components $XS_k$ or $\bar{x}_k$, $YS_k$ or $\bar{y}_k$, and $\Sigma_1''(x_i-\bar{x}_k)(y_i-\bar{y}_k)$.

FIG. 4E illustrates the third example incremental covariance calculation algorithm (incremental algorithm 3) and its equations for incrementally calculating a sample covariance and a population covariance respectively on two computation subsets based on incrementally calculated components $XS_{k+1}$ or $\bar{x}_{k+1}$, $YS_{k+1}$ or $\bar{y}_{k+1}$, and $SXY_{k+1}$.

FIG. 5A illustrates an example of calculating sample covariance using traditional algorithms as shown in FIG. 4A.

FIG. 5B illustrates an example of calculating sample covariance using incremental algorithm 1 as shown in FIG. 4C.

FIG. 5C illustrates an example of calculating sample covariance using incremental algorithm 2 as shown in FIG. 4D.

FIG. 5D illustrates an example of calculating sample covariance using incremental algorithm 3 as shown in FIG. 4E.

FIG. 6 illustrates computational loads for traditional algorithms and incremental algorithms with a computation subset size of 6.

FIG. 7 illustrates computational loads for traditional algorithms and incremental algorithms with a computation subset size of 1,000,000.

DETAILED DESCRIPTION

Figure 1:
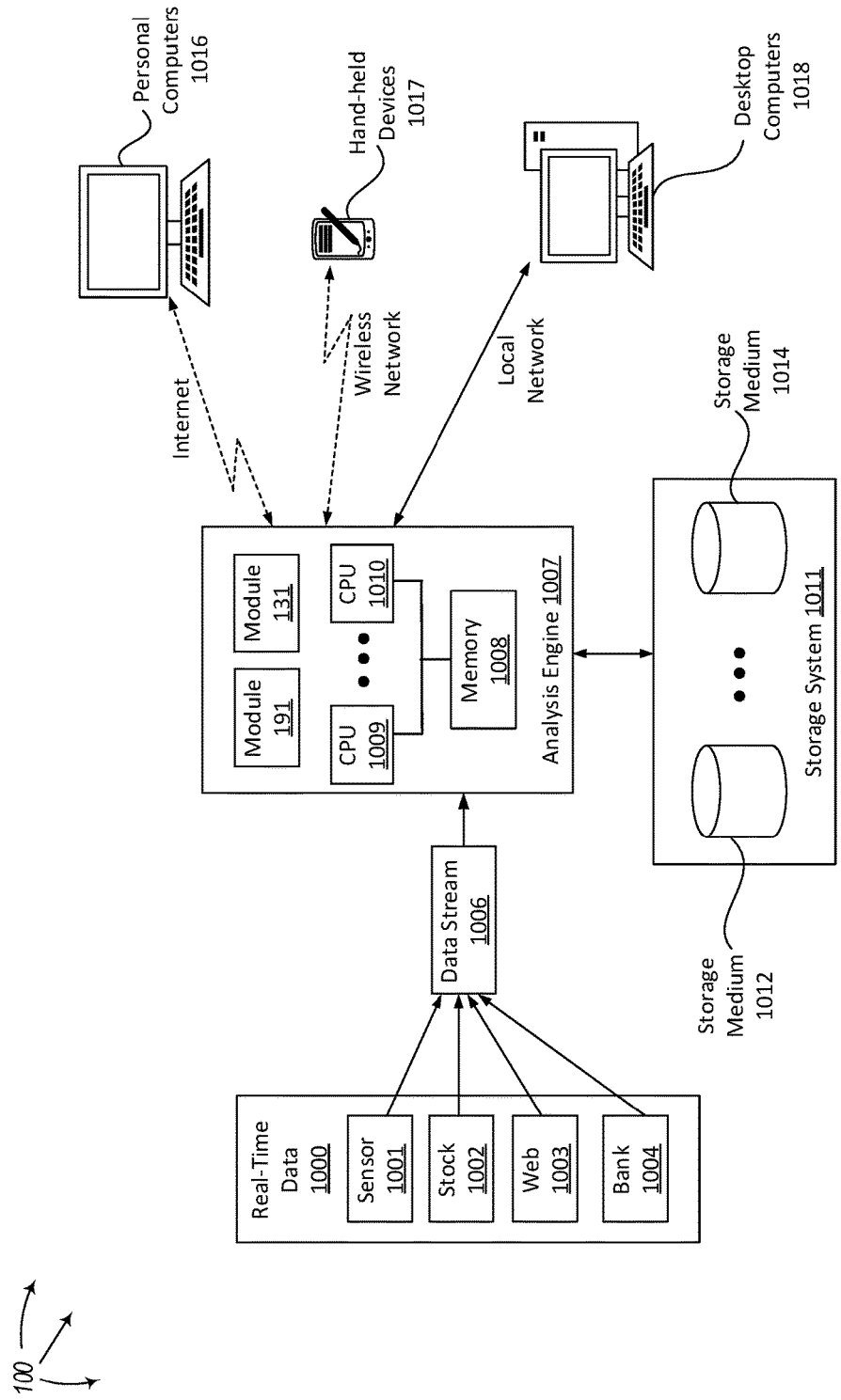
FIG. 1 illustrates a high-level overview of an example computing system that facilitates incrementally calculating covariance for Big Data or streamed data.

The present disclosure describes methods, systems, and computing system program products for incrementally calculating a covariance for Big Data or streamed data. A computing system comprises one or more computing devices. Each of the computing devices comprises one or more processors. The computing system comprises one or more storage media. The computing system has stored one or two data sets on the one or more storage media or has access to one or two data streams. The computing system maintains a computation subset size counter. The computation subset size counter indicates the number of pairs of data elements in two computation subsets of the one or two data sets or the one or two data streams. Embodiments of the invention include incrementally calculating one or more components of a covariance for two modified computation subsets based on one or more components calculated for the two previous computation subsets and then calculating the covariance for the two modified computation subsets based on one or more of the incrementally calculated components. Incrementally calculating covariance not only avoids visiting all the data element in the two computation subsets but also avoids storing the whole computation subsets as traditional algorithms would do, and thus improves the calculation efficiency, saves computing resources and reduces computing system's power consumption. The computing system may also optionally include one or two data buffers for storing accessed or received data elements.

A covariance is a numerical assessment of how much one random variable varies together with another random variable. For two independent random variables, the covariance is zero. However, the converse is not true, e.g., a zero covariance doesn't mean the two random variables are independent to each other.

A computation subset is a subset of a Big Data set which contains the data elements involved in a covariance calculation. A computation subset is equivalent to a computation window when performing a covariance calculation on streamed data or time series data. Within the description of embodiments of the present invention, the difference between a computation window and a computation subset is that data elements in a computation window are ordered but that in a computation subset are not.

A covariance calculation works on two random variables, and thus it works on two computation subsets. The two computation subsets may be either input and stored separately or input and stored in a combined interleaved manner. For the former case, there will be two Big Data sets or input streams and each Big Data set or input stream contains the data elements of one computation subset respectively, and there will be two buffers and each buffer stores the data elements of one computation subset respectively. For the latter case, there will be a single Big Data set or input stream and the Big Data set or input stream contains multiple data pairs with each data pair containing one data element from each computation subset respectively.

A component of a covariance is a quantity or expression appearing in the covariance's definition equation or any transforms of the equation. A covariance is the single largest component of a covariance itself. A covariance may be calculated using one or more components of the covariance. Some example components of a covariance may be found in FIG. 4B.

A component may be either directly incrementally calculated or indirectly incrementally calculated. The difference between them is that when directly incrementally calculating a component, the component is calculated based on the component's value in previous iteration but when indirectly incrementally calculating a component, the component is calculated based on one or more components other than the component itself. The one or more components may have been initialized, directly incrementally calculated or indirectly incrementally calculated.

For a given component, it might be directly incrementally calculated in one algorithm but indirectly incrementally calculated in another algorithm.

For a given algorithm, assume the total number of different components is p ($p \geq 1$), the number of directly incrementally calculated components is v($1 \leq v \leq p$), then the number of indirectly incrementally calculated components is w=p−v($0 \leq w < p$). For any algorithm, there will be at least one component being directly incrementally calculated. It is possible that all components are directly incrementally calculated (in this case v=p and w=0). However, directly incrementally calculated components must be calculated in every iteration no matter if a covariance is accessed or not in a specific iteration.

For a given algorithm, if a component is directly incrementally calculated, then the component must be calculated in every iteration (i.e., whenever a pair of data elements are added to the computation subset). However, if a component is indirectly incrementally calculated, then the component may be calculated as needed using one or more components other than the component itself, i.e., when a covariance needs to be calculated and accessed. So, when a covariance is not accessed in a specific iteration, only a small number of components are incrementally calculated to save computation time. It should be understood that an indirectly incrementally calculated component may also be used in the calculation of a directly incrementally calculated component. In that case, the indirectly incrementally calculated component should also be calculated in every iteration.

Embodiments of the invention include incrementally calculating one or more components of a covariance in two modified computation subsets based on one or more components calculated for two previous computation subsets.

The computing system incrementally calculates one or more components of a covariance starting from either two empty computation subsets or two non-empty computation subsets where a computation subset size and one or more components have already been initialized.

When the computing system incrementally calculating one or more components of a covariance starting from two empty computation subsets, the computation subset size is initialized with a zero and one or more components are initialized with zero values.

When incremental covariance calculation starts from two non-empty computation subsets, the computation subset size and one or more components are initialized. The initialization of the computation subset size comprises counting the number of data elements contained in each of the computation subsets or accessing or receiving a specified computation subset size. The initialization of the one or more components comprises calculating the one or more components through their definitions based on the data elements in the two computation subsets or accessing or receiving pre-calculated one or more components from one or more computing-device-readable media.

The computing system accesses or receives a pair of data elements to be added to the two computation subsets.

The computing system stores the accessed or received pair of data elements into one or two optional data buffers as needed. Pure incremental covariance calculation only needs access to the pair of data elements just accessed or received but do not need access to data elements accessed or received earlier than the just accessed or received pair of data elements, so the computing system doesn't necessarily allocate one or two storage spaces to keep all the data elements of two computation subsets but at least always keeps the computation subset size and one or more components of a covariance for the two computation subsets, and modifying the two computation subsets may be reflected by modifying the computation subset size and one or more components of a covariance for the two computation subsets. However, since iterative covariance calculation requires access to earlier accessed or received pairs of data elements, when combining incremental covariance calculation with iterative covariance calculation, the accessed or received pair of data elements may need to be stored into one or two data buffers for future usage. Thus, the computing system may optionally have one or two data buffers for storing the accessed or received pair of data elements for the two computation subsets and may need to store the received pairs of data elements into the one or two optional data buffers.

The computing system modifies the two computation subsets by adding the accessed or received pair of data elements to the two computation subsets. The computing system modifies the computation subset size counter by adding its value by 1.

The computing system directly incrementally calculating one or more components of a covariance for the two modified computation subsets includes directly incrementally calculating $v(1 \leq v \leq p)$ components of a covariance for the two modified computation subsets based on v components for two previous computation subsets. Directly incrementally calculating v components of a covariance includes directly incrementally calculating each of the v components one by one. Directly incrementally calculating a component of a covariance includes accessing the component calculated for the prior computation subset. Directly incrementally calculating a component of a covariance includes adding a contribution of the added pair of data elements to the component mathematically. For example, directly incrementally calculating the components includes calculating a sum or mean for each modified computation subset respectively. Calculating the sum or mean for the two modified computation subsets includes accessing the pair of data elements added to the two computation subsets and accessing the sum or mean. Calculating the sum or mean for the two modified computation subsets includes adding a contribution of the added pair of data to the sum or mean mathematically.

The computing system incrementally calculating one or more components of a covariance for the two modified computation subsets includes indirectly incrementally calculating $w=p-v$ components of a covariance for the modified computation subsets as needed. Indirectly incrementally calculating the w components of a covariance includes indirectly incrementally calculating each of the w components one by one. Indirectly incrementally calculating a component includes calculating the component by accessing and using one or more components other than the component itself. The one or more components may have been initialized, directly incrementally calculated or indirectly incrementally calculated.

The computing system then generates a covariance, either a sample covariance or a population covariance, as needed based on one or more incrementally calculated components of a covariance.

The computing system may keep accessing or receiving a pair of data elements to be added to the two computation subsets, storing the accessed or received pair of data elements into one or two optional data buffers as needed, modifying the computation subsets and the computation subset size counter, incrementally calculating one or more components, and generating a covariance (either a sample covariance or a population covariance) as needed using one or more incrementally calculated components, and the computing system may repeat this process for as many times as needed.

Embodiments of the present invention may comprise or utilize a special purpose or general-purpose computing device including computing device hardware, such as, for example, one or more processors and system memory, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phasechange memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device or special purpose computing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

FIG. 1 illustrates a high-level overview of an example computing system 100 that facilitates incrementally calculating covariance for Big Data or streamed data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, covariance calculation module 191 and component calculation modules 131. Covariance calculation module 191 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. Data from different data sources may also be stored in storage system 1011 which may be accessed for Big Data analysis. It should be understood that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
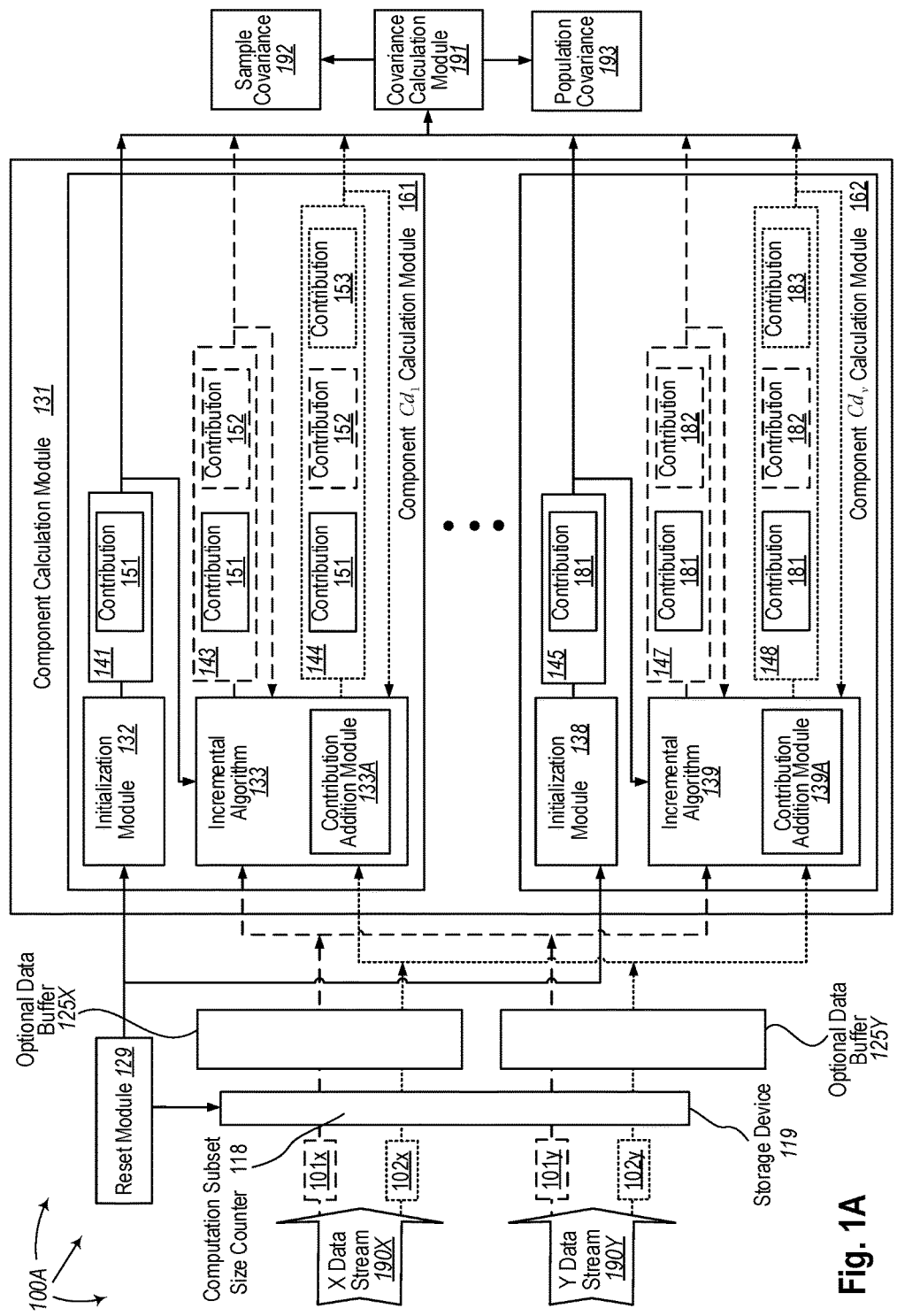
FIG. 1A illustrates an example computing system architecture that facilitates incrementally calculating covariance for streamed data with two inputs with all components being directly incrementally calculated.

FIG. 1A illustrates an example computing system architecture 100A that facilitates incrementally calculating covariance for streamed data with two inputs with all components ($p(p=v≤1)$) being directly incrementally calculated. FIG. 1A illustrates 1007 and 1006 shown in FIG. 1. Referring to FIG. 1A, computing system architecture 100A includes incremental component calculation module 131, covariance calculation module 191, and covariance computing results: sample covariance 192 and population covariance 193. Incremental component calculation module 131 may be connected to (or is part of) a network, such as, for example, a Local Area Network ("LAN"), a Wide Area Network ("WAN"), and even the Internet. Accordingly, incremental component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of covariance calculation module 191, and covariance calculation module 191 will generate sample covariance 192 and/or population covariance 193.

In general, data stream 190X and data stream 190Y may be a sequence of digitally encoded signals (e.g., packets of data or data packets) respectively used to transmit or receive information that is in the process of being transmitted. Data stream 190X and data stream 190Y may stream data elements to computing system architecture 100A. Data stream 190X and data stream 190Y may be a live stream or may stream stored data.

Computation subset size counter 118 may be implemented in hardware or software. When it is implemented in hardware, counter 118 may be a small device that may update a computation subset size stored in a location in counter 118. When it is implemented in software, counter 118 may be just a variable stored in RAM, hard drive or any other computing-device-readable storage media, and the content of counter 118 is a computation subset size. Computation subset size counter 118 may be used to keep track the size of a computation subset. Whenever receiving a pair of data elements, the computing system modifies the two computation subsets by adding the pair of data elements to the two computation subsets and modifies the computation subset size counter 118 by increasing its content or value by 1. Computation subset size counter 118 may be accessed or received by component calculation module 131, and it may be reset to 0 when incremental covariance calculation is reset or set to a specific value by reset module 129 when incremental covariance calculation starts working on a non-empty computation subset. Within the description of this disclosure, a computation subset size counter is equivalent to a computation subset size and may be used interchangeably.

For example, as depicted in FIG. 1A, when a pair of data elements ($101x, 101y$) is received, the counter 118 will be increased by 1. Both the computation subset size counter 118 and the pair of data elements ($101x, 101y$) may be accessed or received by component calculation module 131.

Subsequently, a pair of data elements ($102x, 102y$) may be received. When this happens, the computation subset counter 118 will increase its value by 1. Both the modified computation subset size counter 118 and the pair of data elements ($102x, 102y$) may be accessed or received by component calculation module 131.

As a pair of data elements to be added to the two computation subsets are accessed or received, they may be stored into two optional data buffers 125X and 125Y as needed (i.e., when combining incremental covariance calculation with iterative covariance calculation).

Referring to computing system architecture 100A, component calculation module 131 comprises $v(v=p≥1)$ component calculation modules for calculating v components for data elements in two computation subsets. The number of components, v, varies depending on which incremental algorithm is used. As depicted in FIG. 1A, component calculation module 131 comprises component $Cd_1$ calculation module 161 and component $Cd_v$ calculation module 162, and there are v−2 other component calculation modules between them. Component $Cd_1$ calculation module 161 comprises initialization module 132 for initializing component $Cd_1$ and incremental algorithm 133 for incrementally calculating component $Cd_1$. Component $Cd_v$ calculation module 162 comprises initialization module 138 for initializing component $Cd_v$ and incremental algorithm 139 for incrementally calculating component $Cd_v$. Initialization module 132 is configured to initialize component $Cd_1$ for data elements in two computation subsets and Initialization module 138 is configured to initialize component $Cd_v$ for data elements in two computation subsets. Component $Cd_1$ 141 is the initial value of component $Cd_1$. Initialization module 132 may be used for an initialization of component $Cd_1$ or when covariance calculations are reset. Initialization module 132 either initialize component $Cd_1$ 141 to be zero if the two computation subsets are empty (the computation subset size counter is zero) or a specific value contribution 151 passed in by reset module 129 if the two computation subsets are non-empty. Similarly, initialization module 138 may be used for an initialization of component $Cd_v$ or when covariance calculations are reset. Component $Cd_v$ 145 is the initial value of component $Cd_v$. Initialization module 138 either initialize component $Cd_v$ 145 to be zero if the two computation subsets are empty (the computation subset size counter is zero) or a specific value contribution 181 passed in by reset module 129 if the two computation subsets are non-empty.

Incremental algorithms are also configured to calculate v components for data elements in two computation subsets. Incremental algorithm 133 receives a prior component $Cd_1$ value and a pair of data elements to be added to the two computation subsets as input. Incremental algorithm 133 calculates a component $Cd_1$ for the two modified computation subsets based on the prior component $Cd_1$ value and the added pair of data elements. Contribution addition module 133A may add a contribution for the added data element to the prior component $Cd_1$. Adding a contribution for the added pair of data elements may be used for calculating component $Cd_1$ for the modified computation subset. Incremental algorithm 139 works in a similar way as incremental algorithm 133. Incremental algorithm 139 receives a prior component $Cd_v$ value and a pair of data elements to be added to the two computation subsets as input. Incremental algorithm 139 calculates a component $Cd_v$ for the two modified computation subsets based on the prior component $Cd_v$ value and the added pair of data elements. Contribution addition module 139A may add a contribution for the added pair of data elements to the prior component $Cd_v$. Adding a contribution for the added pair of data elements may be used for calculating component $Cd_v$ for the modified computation subset.

Referring to FIG. 1A, computing system architecture 100A also includes covariance calculation module 191, sample covariance 192 and population covariance 193. Once p (p=v≥1) components of a covariance are incrementally calculated by component calculation module 131, covariance calculation module 191 may directly calculate the sample covariance 192 and/or population covariance 193 based on one or more incrementally calculated components.

Figure 1B:
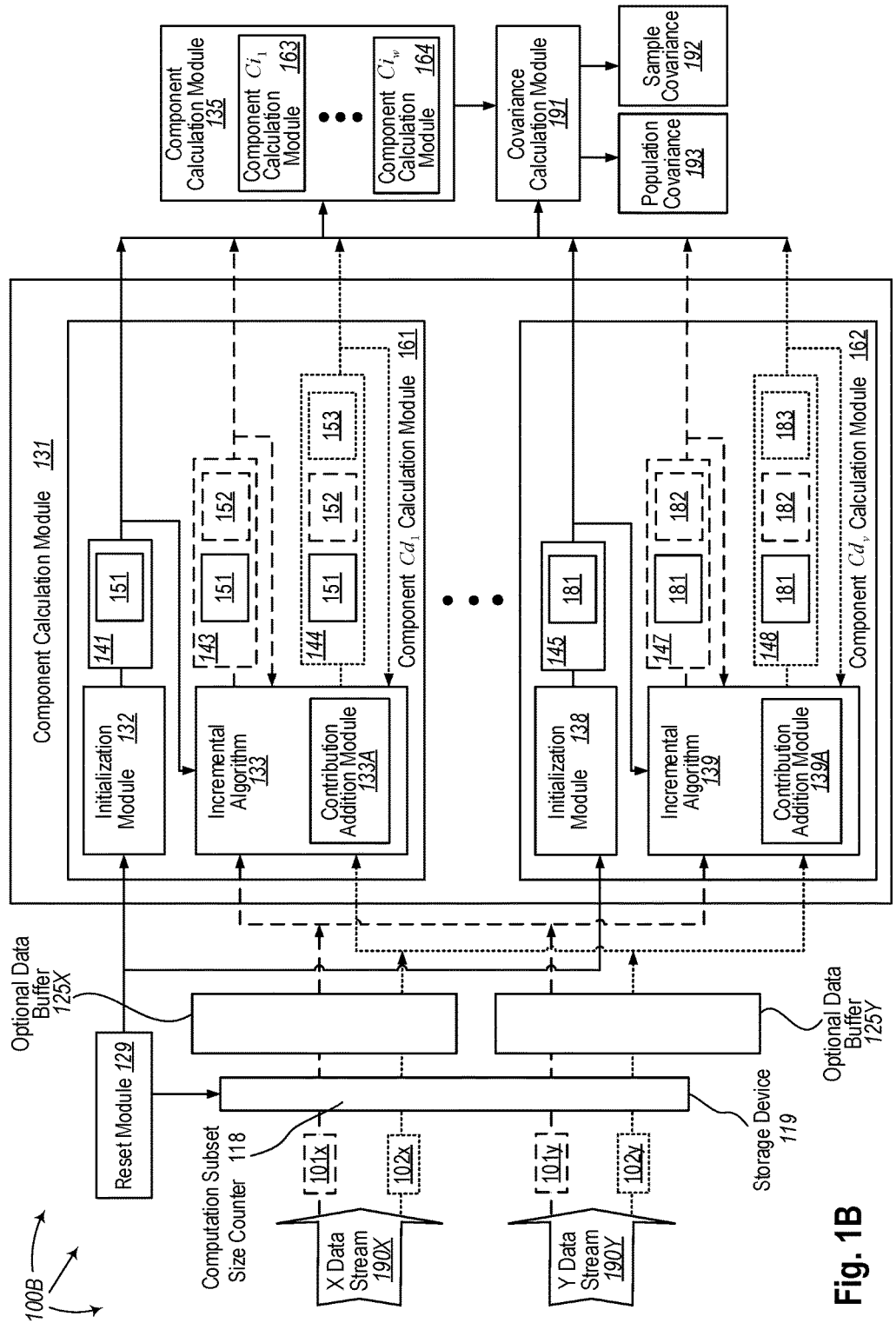
FIG. 1B illustrates an example computing system architecture that facilitates incrementally calculating covariance for streamed data with two inputs with some components being directly incrementally calculated and some components being indirectly incrementally calculated.

FIG. 1B illustrates an example computing system architecture 100B that facilitates incrementally calculating a sample covariance and/or a population covariance for Big Data or streamed data with two inputs with some (v(1≤v<p)) components being directly incrementally calculated and some (w(w=p−v)) components being indirectly incrementally calculated. In certain implementations, the difference between computing system architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Computing system architecture 100B also includes component calculation module 131 and 131 also includes v component calculation modules for directly incrementally calculating v components, however the number v in 100B may not be the same number v as in 100A, because some directly incrementally calculated components in 100A are indirectly incrementally calculated in 100B. In 100A, v=p≥1, but in 100B, 1≤v<p. Referring to FIG. 1B, computing system architecture 100B includes component calculation module 135. The output of components calculation module 131 may be used as the input of component calculation module 135, and the output of calculation modules 131 and 135 may be used as the input of covariance calculation module 191, and covariance calculation module 191 may generate sample covariance 192 and/or population covariance 193. Component calculation module 135 generally includes w=p−v component calculation modules for indirectly incrementally calculating w components. For example, Component calculation module 135 includes calculation module 163 for indirectly incrementally calculating component $Ci_1$ and calculation module 164 for indirectly incrementally calculating component $Ci_w$, and there are w−2 component calculation modules in between. Indirectly incrementally calculating w components includes indirectly incrementally calculating each of the w components one by one. Indirectly incrementally calculating a component includes accessing and using one or more components other than the component itself. The one or more components may have been initialized, directly incrementally calculated or indirectly incrementally calculated.

Referring to computing system architecture 100B, once all p (p=v+w) components have been incrementally calculated, covariance calculation module 191 may be used for calculating a sample covariance 192 and/or a population covariance 193 as needed based on one or more incrementally calculated or initialized components.

Figure 1C:
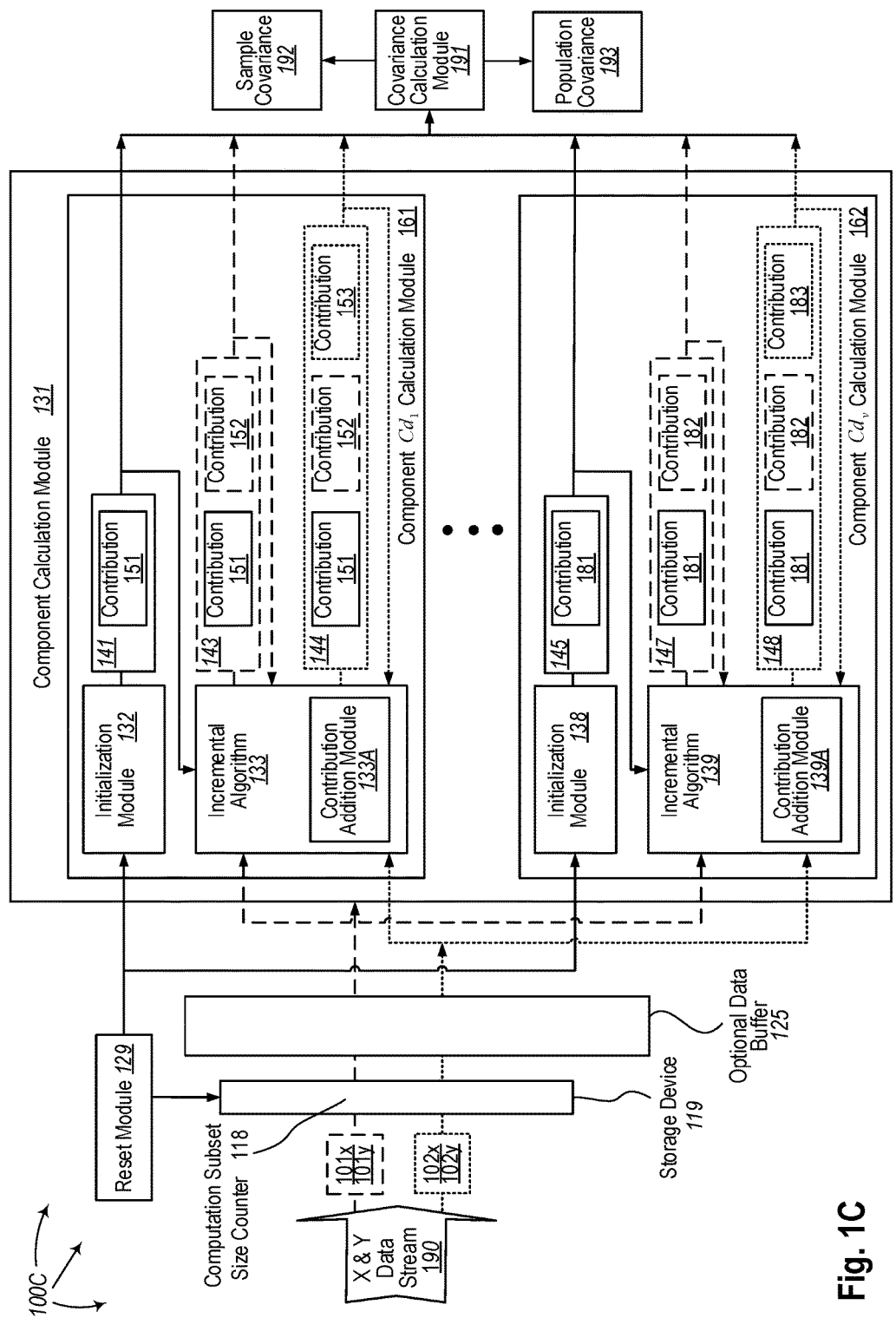
FIG. 1C illustrates another example computing system architecture that facilitates incrementally calculating covariance for streamed data with a single input where data elements from two data streams are interleaved with all components being directly incrementally calculated.

FIG. 1C illustrates an example computing system architecture 100C that facilitates incrementally calculating a sample covariance and/or a population covariance for Big Data or streamed data with a single input where data elements from two Big Data sets or two data streams are interleaved with all (p=v≥1) components being directly incrementally calculated. In certain implementations, the difference between computing system architectures 100C and 100A may be that architecture 100C uses a single stream as input where two sets of data elements are interleaved and 100C uses a single circular buffer for storing data elements in two computation subsets. All parts except the input mode in 100C work in a similar way as those parts with the same reference numbers in 100A. Instead of repeating what have already been explained in the description about 100A, only the different part is discussed here. Referring to FIG. 1C, data stream 190 comprises two interleaved data streams X and Y. As pairs of streamed data elements are accessed or received, the streamed data elements may be placed in a location within an optional data buffer 125 (when combining incremental covariance calculation with iterative covariance calculation).

Referring to FIG. 1C, computing system architecture 100C also includes covariance calculation module 191, sample covariance 192 and population covariance 193. Once p (p=v≥1) components of a covariance are incrementally calculated by component calculation module 131, covariance calculation module 191 may calculate the sample covariance 192 and/or the population covariance 193 as needed based on one or more incrementally calculated or initialized components.

Figure 1D:
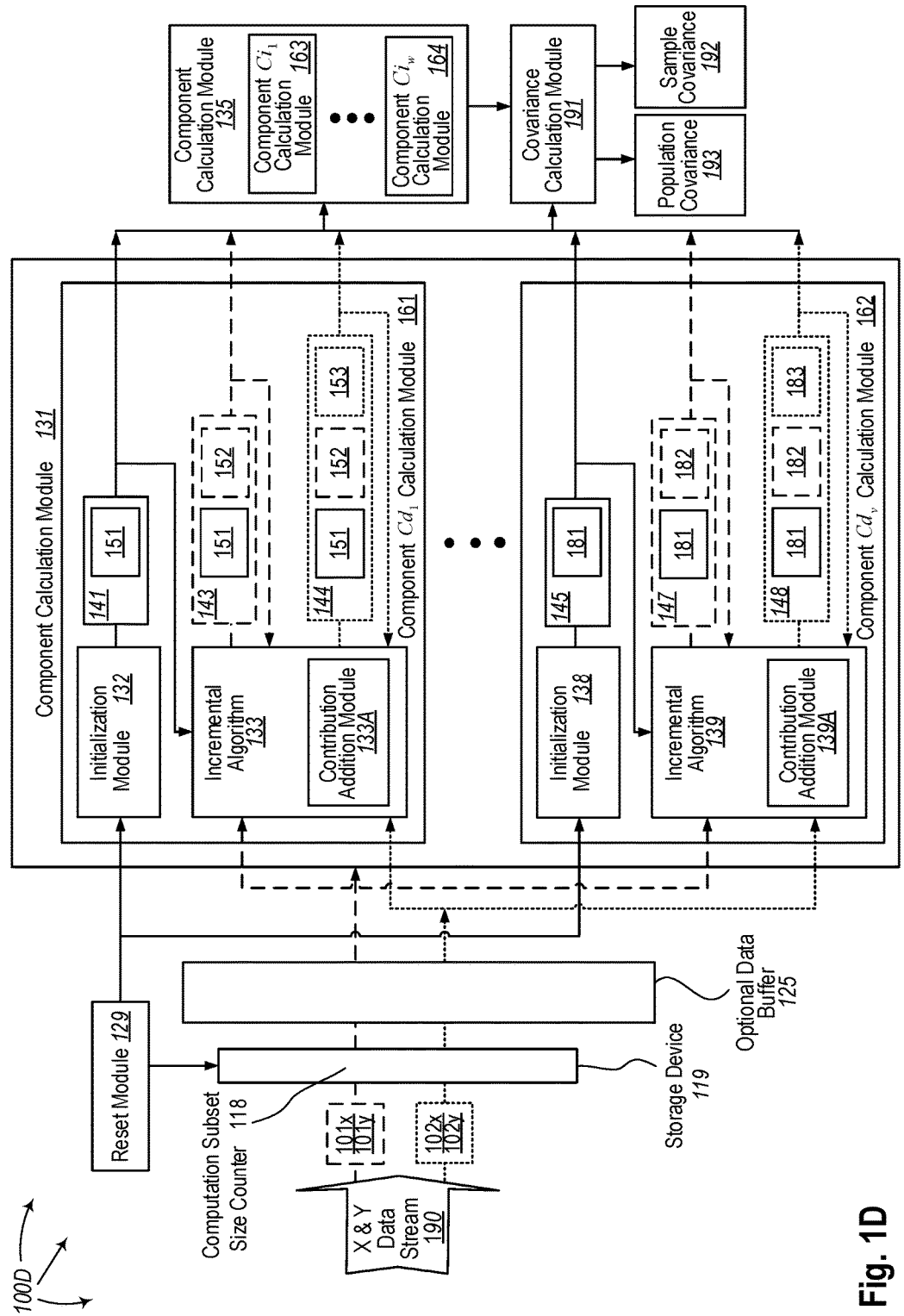
FIG. 1D illustrates another example computing system architecture that facilitates incrementally calculating covariance for streamed data with a single input where data elements from two data streams are interleaved with some components being directly incrementally calculated and some components being indirectly incrementally calculated.

FIG. 1D illustrates an example computing system architecture 100D that facilitates incrementally calculating a sample covariance and/or a population covariance for Big Data or streamed data with a single input where data elements from two Big Data sets or two data streams are interleaved with some (v(1≤v<p)) components being directly incrementally calculated and some (w(w=p−v)) components being indirectly incrementally calculated. In certain implementations, the difference between computing system architectures 100D and 100C may be that architecture 100D includes a component calculation module 135. All parts except component calculation module 135 in 100D work in a similar way as those parts with the same reference numbers in 100A and 100C. Instead of repeating what have already been explained in the descriptions about 100A and 100C respectively, only the different part is discussed here. Computing system architecture 100D also includes component calculation module 131, which also includes v component calculation modules for directly incrementally calculating v components, however the number v in 100D may not be the same number v as in 100C, because some directly incrementally calculated components in 100C are indirectly incrementally calculated in 100D. In 100C, v=p≥1, but in 100D, 1≤v<p. Referring to FIG. 1D, computing system architecture 100D includes component calculation module 135. Component calculation module 135 includes w=p−v component calculation modules for indirectly incrementally calculating w components. Indirectly incrementally calculating w components includes indirectly incrementally calculating each of the w components one by one. Indirectly incrementally calculating a component includes accessing and using one or more components other than the component itself. The one or more components may have been initialized, directly incrementally calculated or indirectly incrementally calculated.

Referring to computing system architecture 100D, once all p (p=v+w) components have been incrementally calculated, covariance calculation module 191 may be used for calculating a sample covariance 192 and/or a population covariance 193 as needed based on one or more incrementally calculated or initialized components.

Figure 1E:
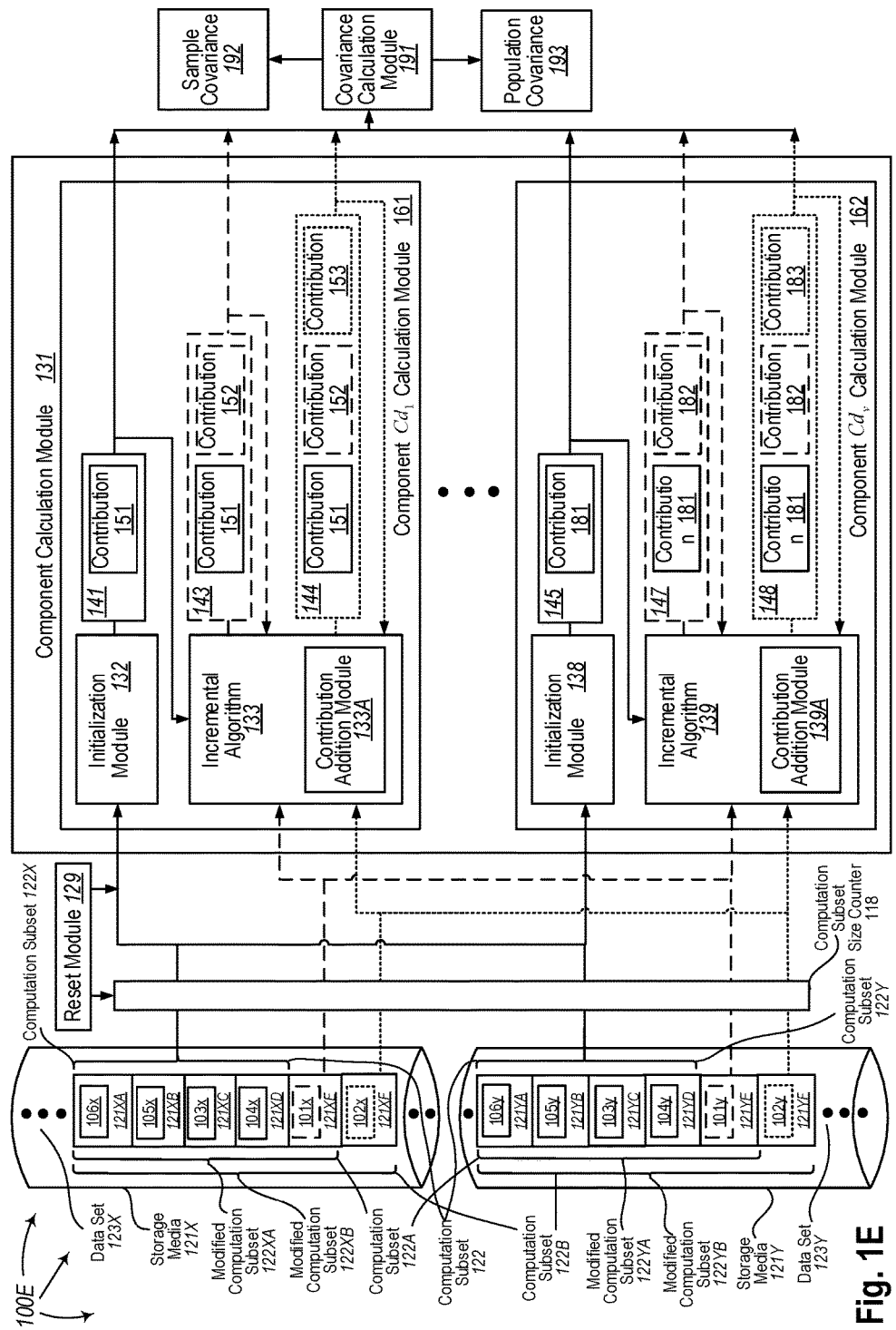
FIG. 1E illustrates an example computing system architecture that facilitates incrementally calculating covariance for Big Data with two inputs with all components being directly incrementally calculated.

FIG. 1E illustrates an example computing system architecture 100E that facilitates incrementally calculating covariance for Big Data. Referring to FIG. 1E, computing system architecture 100E includes incremental component calculation module 131, covariance calculation module 191, sample covariance calculation result 192 and population covariance calculation result 193. Incremental component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet. The output of component calculation module 131 will be used as the input of covariance calculation module 191, and covariance calculation module 191 will generate sample covariance 192 and/or population covariance 193.

Storage media 121X comprises a data set 123X, and storage media 121Y comprises a data set 123Y. In general, data sets 123X and 123Y may comprise different kinds of data, such as, for example, stock quotes, audio data, video data, geospatial data, web data, mobile communication data, online gaming data, banking transaction data, sensor data, and closed-captioning data, real time text, etc.

As depicted, data set 123X comprises multiple data elements stored in multiple locations of storage media 121X. For example, data elements $101x$, $102x$, $103x$, $104x$, $105x$ and $106x$ are stored in locations 121XE, 121XF, 121XC, 121XD and 121XB and 121XA of storage media 121X respectively, and there are multiple other data elements stored in other locations of storage media 121X. Similarly, data set 123Y comprises multiple data elements stored in multiple locations of storage media 121Y. For example, data elements $101y$, $102y$, $103y$, $104y$ and $105y$ are stored in locations 121YE, 121YF, 121YC, 121YD, 121YB and 121YA of storage media 121Y respectively, and there are multiple other data elements stored in other locations of storage media 121Y.

Computation subset 122, a non-empty computation subset of data set 123X and 123Y, contains multiple pairs of data elements from the two data sets with each pair containing one data element from each data sets. For example computation subset 122 includes ($101x$, $101y$), ($102x$, $102y$), ($103x$, $103y$), ($104x$, $104y$), ($105x$, $105y$) and ($106x$, $106y$) of data sets 123X and 123Y. Computation subset 122 comprises two subsets: computation subset 122X and computation subset 122Y.

Whenever accessing a pair of data elements from the storage media, the computing system modifies the two computation subsets by adding the pair of data elements to the two computation subsets and modifies the computation subset size counter 118 by increasing its content or value by 1. Computation subset size counter 118 may be accessed or received by component calculation module 131, and it may be set to a specific value by reset module 129 when incremental covariance calculation starts working on a non-empty computation subset. For example, in 100E, before accessing a pair of data elements ($101x$, $101y$), computation subset 122 contains 4 pairs of data elements, so computation subset size counter 118 may be initialized to 4. When a pair of data elements ($101x$, $101y$) is accessed from locations (121XE, 121YE), ($101x$, $101y$) is added to computation subsets 122X and 122Y respectively, and computation subsets 122X and 122Y become computation subsets 122XA and 122YA respectively, and computation subset size counter 118 is increased by 1. Both computation subset size counter 118 and data element ($101x$, $101y$) may be accessed or received by component calculation module 131.

Subsequently, a pair of data elements ($102x$, $102y$) may be accessed from locations (121XF, 121YF). ($102x$, $102y$) will be added the computation subsets 122XA and 122YA respectively, and computation subsets 122XA and 122YA will become computation subsets 122XB and 122YB respectively. Computation subset size counter 118 will be increased by 1. Both the modified computation subset size counter 118 and the pair of data elements ($102x$, $102y$) may be accessed or received by component calculation module 131.

Incremental covariance calculation starts from two computation subsets where a computation subset size and one or more components of a covariance for the two computation subsets may have already been initialized or calculated. For example, in computing system architecture 100E, components ranging from $Cd_1$ 141 to $Cd_v$ 145 have been initialized. As depicted in FIG. 1E, component $Cd_1$ 141 includes contribution 151 (a contribution from a pair of data elements ($101x$, $101y$)), contribution 152 (a contribution from a pair of data elements ($102x$, $102y$)), and contribution 153 (contributions from other data elements). Similarly, component $Cd_v$ 145 includes contribution 181 (a contribution from a pair of data elements ($101x$, $101y$)) and contribution 182 (a contribution from a pair of data elements ($102x$, $102y$)), and contribution 183 (contributions from other data elements).

Referring to computing system architecture 100A, incremental component calculation module 131 comprises $v(v=p\geq 1)$ component calculation modules for calculating v components for data elements in two computation subsets. The number v varies depending on the incremental algorithm chosen. As depicted in FIG. 1E, component calculation module 131 comprises component $Cd_1$ calculation module 161 and component $Cd_v$ calculation module 162, and there are v−2 other component calculation modules between them. Calculation module 161 comprises initialization module 132 for initializing component $Cd_1$ and incremental algorithm 133 for incrementally calculating component $Cd_1$. Calculation module 162 comprises initialization module 138 for initializing component $Cd_v$ and incremental algorithm 139 for incrementally calculating component $Cd_v$. Initialization module 132 is configured to initialize component $Cd_1$ for data elements in two computation subsets and Initialization module 138 is configured to initialize component $Cd_v$ for data elements in two computation subsets. Component $Cd_1$ 141 is the initial value of component $Cd_1$. Initialization module 132 may be used for an initialization of component $Cd_1$ or when covariance calculations are reset. Initialization module 132 either initialize component $Cd_1$ 141 to be zero if the computation subset is empty (the computation subset size counter is zero) or a specific value contribution 151 passed in by reset module 129 if the computation subset is non-empty. Similarly, initialization module 138 may be used for an initialization of component $Cd_v$ or when covariance calculations are reset. Component $Cd_v$ 145 is the initial value of component $Cd_v$. Initialization module 138 either initialize component $Cd_v$ 145 to be zero if the computation subset is empty (the computation subset size counter is zero) or a specific value contribution 181 passed in by reset module 129 if the computation subset is non-empty.

Incremental algorithms are also configured to calculate v components for data elements in two computation subsets. Incremental algorithm 133 accesses or receives a prior component $Cd_1$ value and the accessed pair of data elements as input. Incremental algorithm 133 directly incrementally calculates a component $Cd_1$ for the two modified computation subsets based on the prior component $Cd_1$ value and the added pair of data elements. Contribution addition module 133A may add a contribution for the added pair of data elements to the prior component $Cd_1$. Adding a contribution for the added pair of data elements may be used to calculate component $Cd_1$ for the two modified computation subsets.

Incremental algorithm 139 works in a similar way as incremental algorithm 133. Incremental algorithm 139 receives a prior component $Cd_v$ value and an accessed pair of data elements from two computation subsets as input. Incremental algorithm 139 directly incrementally calculates a component $Cd_v$ for the two modified computation subsets based on the prior component $Cd_v$ value and the added pair of data elements. Contribution addition module 139A may add a contribution for the added pair of data elements to the prior component $Cd_v$. Adding a contribution for the added pair of data elements may be used to calculate component $Cd_v$ for the two modified computation subsets.

Referring to FIG. 1E, computing system architecture 100E also includes covariance calculation module 191. Once p (p≥1) components of a covariance are incrementally calculated by component calculation module 131, covariance calculation module 191 may calculate the sample covariance 192 and/or population covariance 193 based on one or more incrementally calculated or initialized components.

Figure 1F:
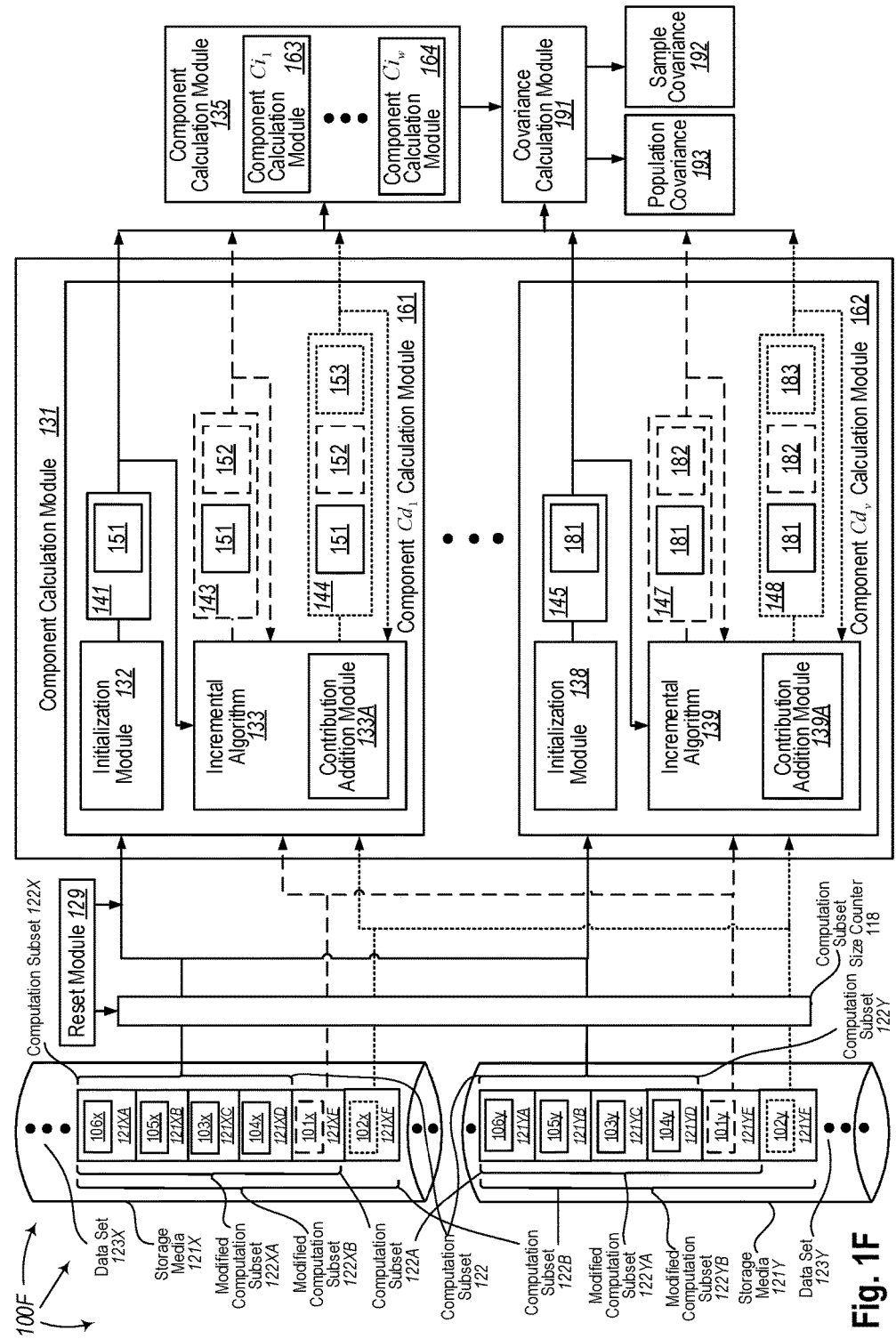
FIG. 1F illustrates an example computing system architecture that facilitates incrementally calculating covariance for Big Data with two inputs with some components being directly incrementally calculated and some components being indirectly incrementally calculated.

FIG. 1F illustrates an example computing system architecture 100F that facilitates incrementally calculating a covariance for Big Data with two inputs with some (v(1≤v<p)) components being directly incrementally calculated and some (w(w=p−v)) components being indirectly incrementally calculated. Number v and number w are algorithm dependent. Many parts included in computing system architectures 100F and 100E have same reference numbers. Those parts have similar structures and work in similar ways. In certain implementations, the difference between computing system architectures 100F and 100E may be that architecture 100F includes a component calculation module 135. All parts except component calculation module 135 in 100F work in a similar way as those parts with the same reference numbers in 100A. Instead of repeating what have already been explained in the description about 100A, only the different part is discussed here. The number v in 100F may not be the same number v as in 100E, because some directly incrementally calculated components in 100E are indirectly incrementally calculated in 100F. In 100E, v=p≥1, but in 100F, 1≤v<p. Referring to FIG. 1F, computing system architecture 100F includes component calculation module 135. The output of components calculation module 131 may be used as the input of component calculation module 135, and the output of calculation modules 131 and 135 may be used as the input of covariance calculation module 191, and covariance calculation module 191 may generate sample covariance 192 and/or population covariance 193. Component calculation module 135 generally includes w=p−v component calculation modules for indirectly incrementally calculating w components. For example, Component calculation module 135 includes calculation module 163 for indirectly incrementally calculating component $Ci_1$ and calculation module 164 for indirectly incrementally calculating component $Ci_w$, and there are w−2 component calculation modules in between. Indirectly incrementally calculating w components includes indirectly incrementally calculating each of the w components one by one. Indirectly incrementally calculating a component includes accessing and using one or more components other than the component itself. The one or more components may be initialized, directly incrementally calculated or indirectly incrementally calculated.

Referring to computing system architecture 100F, once all p (p=v+w) components have been incrementally calculated, covariance calculation module 191 may be used for calculating a sample covariance 192 and/or population covariance 193 as needed based on one or more incrementally calculated or initialized components.

Figure 1G:
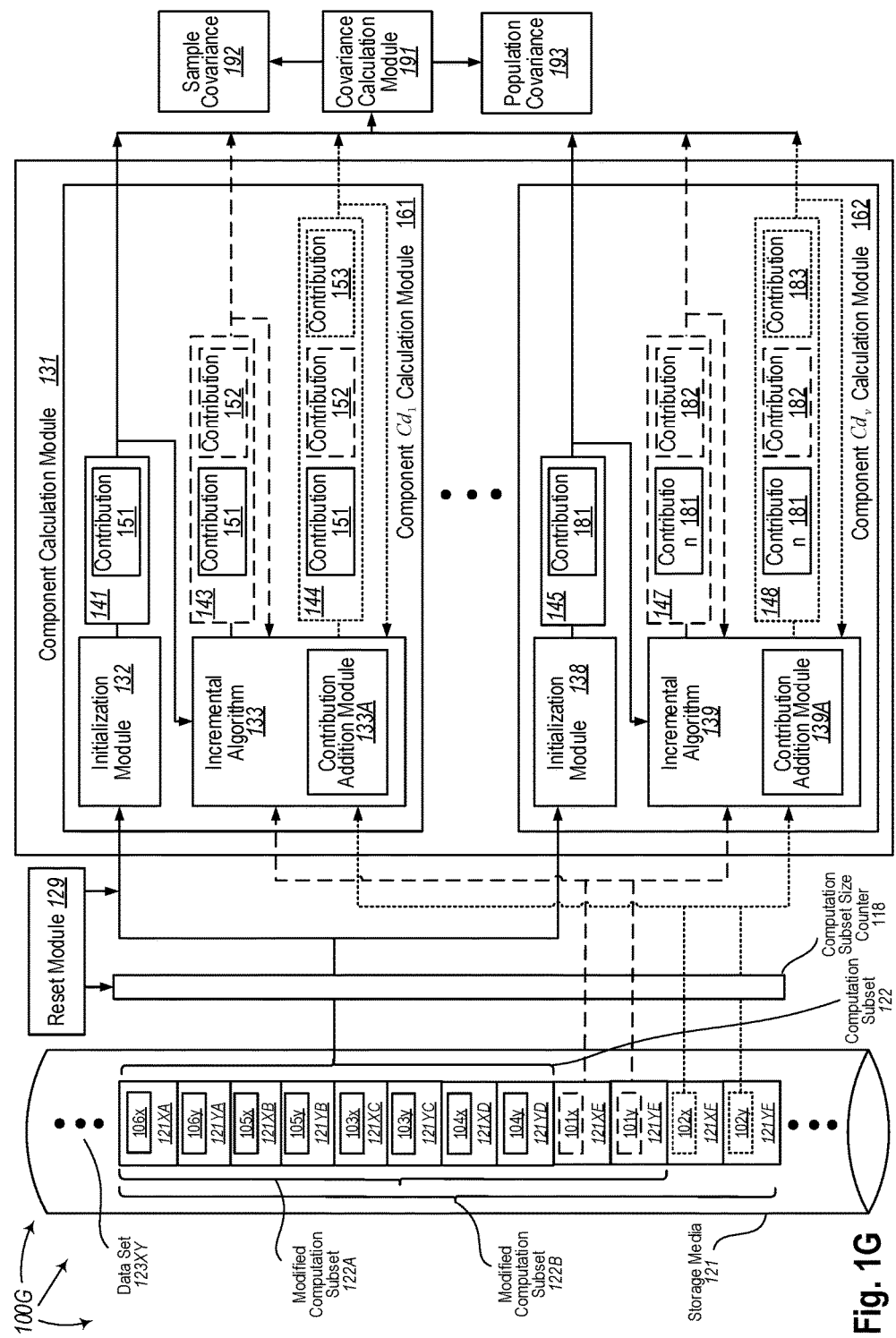
FIG. 1G illustrates an example computing system architecture that facilitates incrementally calculating covariance for Big Data with a single input where data elements from two Big Data sets are interleaved with all components being directly incrementally calculated.
Figure 1G:
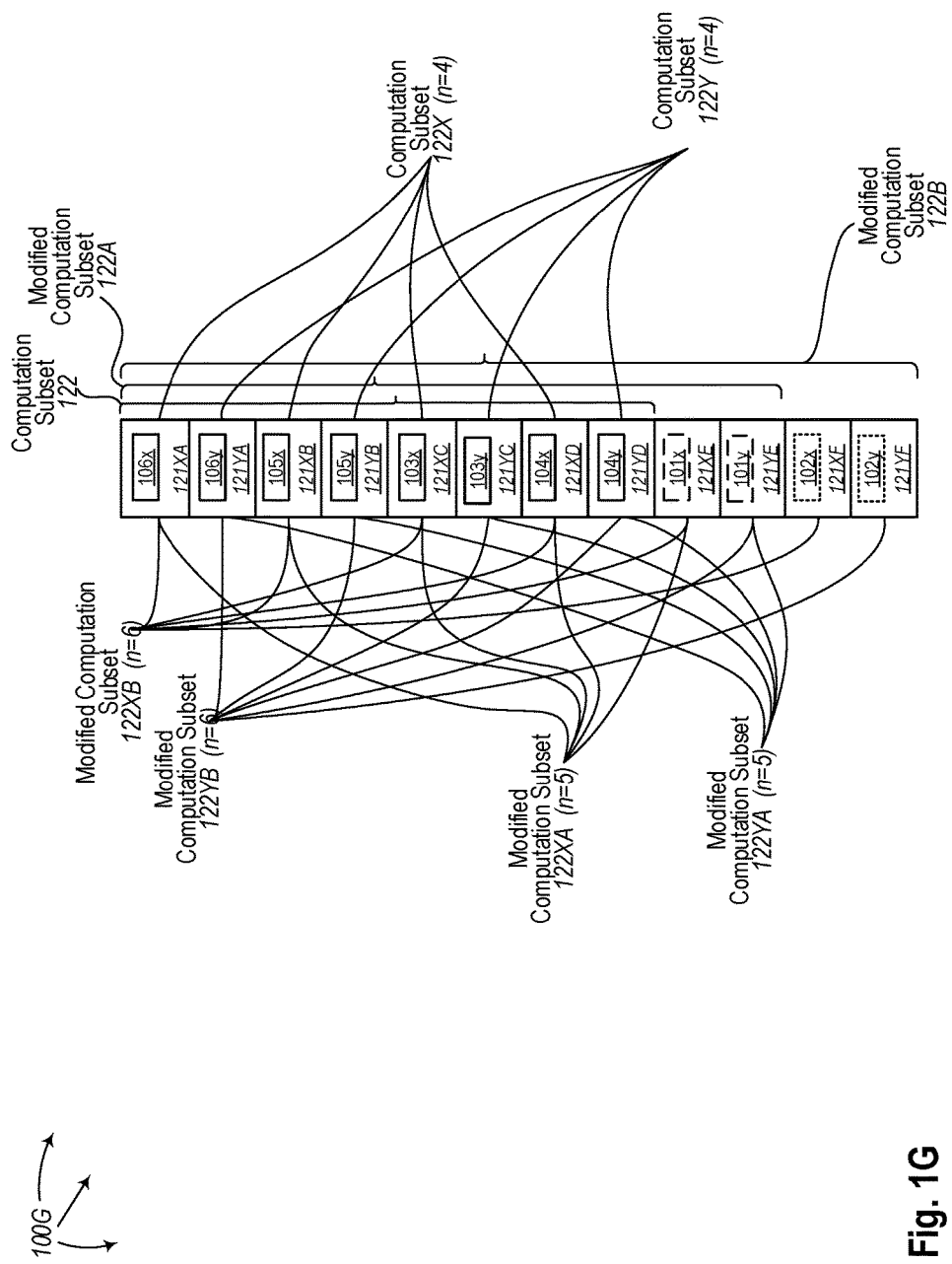

FIG. 1G illustrates an example computing system architecture 100F that facilitates incrementally calculating a covariance for Big Data with a single input where data elements from two Big Data sets are interleaved with all (v=p≥1) components being directly incrementally calculated. In certain implementations, the difference between computing system architectures 100G and 100E may be that architecture 100G uses a single input where two sets of data elements are interleaved. All parts except the input mode in 100G work in a similar way as those parts with the same reference numbers in 100E. Instead of repeating what have already been explained in the description about 100E, only the different part is discussed here. Referring to FIG. 1G, there is a storage media 121. Storage media 121 includes a data set 123XY where data elements from data set X and data set Y are interleaved, i.e., data elements from two data sets are placed alternatively. As pairs of data elements are accessed, the data elements are accessed from locations that may be next to each other. For example, a pair of data elements (106x, 106y) may be accessed from locations (121XA,121YA) that are next to each other, and a pair of data elements (105x, 105y) may be accessed or received from locations (121XB,121YB) that are next to each other, and a pair of data elements (103x, 103y) may be accessed or received from locations 121XC and 121YC that are next to each other, and a pair of data elements (104x, 104y) may be accessed or received from locations 121XD and 121YD that are next to each other. Computation subset 122 contains 4 pairs of data elements: (106x, 106y), (105x, 105y), (103x, 103y) and (104x, 104y). The computing system may use data elements in computation subset 122 for initializing one or more components of a covariance.

Next, a pair of data elements (101x, 101y) to be added to computation subset 122 may be accessed. Data elements (101x, 101y) may be accessed from locations (121XE, 121YE). After (101x, 101y) is added to computation subsets 122, computation subset 122 becomes modified computation subsets 122A, and computation subset size counter 118 is increased by 1. The computing system may incrementally calculate a covariance for modified computation subset 122A.

Subsequently, a pair of data elements (102x, 102y) to be added to modified computation subset 122A may be accessed. Data elements (102x, 102y) may be accessed from locations (121XF,121YF). After (102x, 102y) is added to modified computation subset 122A, modified computation subset 122A becomes modified computation subset 122B, and computation subset size counter 118 will be increased by 1. The computing system may incrementally calculate a covariance for modified computation subset 122B.

As depicted in FIG. 1G, computation subset 122 comprises two computation subsets to be used in covariance calculation: computation subset 122X (n=4) and computation subset 122Y (n=4). Computation subset 122X and computation subset 122Y are stored in an interleaved way (as depicted in FIG. 1G Cont'd). Computation subset 122X contains 4 data elements 106x, 105x, 103x and 104x, and they are stored in 121XA, 121XB, 121XC and 121XD respectively. Computation subset 122Y contains four data elements 106y, 105y, 103y and 104y, and they are stored in 121YA, 121YB, 121YC and 121YD respectively. A pair of data elements (101x, 101y) may be accessed from location 121XE and 121YE. After the pair of data elements (101x, 101y) is added, computation subset 122 becomes modified computation subset 122A. When computation subset 122 becomes modified computation subset 122A, computation subsets 122X and 122Y contained in computation subset 122 become modified computation subsets 122XA and 122YA respectively at the same time (as depicted in FIG. 1G Cont'd). A pair of data elements (102$x$, 102$y$) may be accessed from location 121XF and 121YF. After the pair of data elements (102$x$, 102$y$) is added, modified computation subset 122A becomes modified computation subset 122B. When modified computation subset 122A becomes modified computation subset 122B, modified computation subsets 122XA and 122YA contained in modified computation subset 122A become modified computation subsets 122XB and 122YB respectively at the same time (as depicted in FIG. 1G Cont'd).

FIG. 1G Cont'd illustrates the details about computation subset 122X, modified computation subset 122XA, modified computation subset 122XB, computation subset 122Y, modified computation subset 122YA, and modified computation subset 122YB. Computation subset 122X contains data elements 106$x$, 105$x$, 103$x$ and 104$x$ that may be accessed from locations 121XA, 121XB, 121XC and 121XD respectively. Computation subset 122Y contains data elements 106$y$, 105$y$, 103$y$ and 104$y$ that may be accessed or received from locations 121YA, 121YB, 121YC and 121YD respectively. Modified computation subset 122XA contains data elements 106$x$, 105$x$, 103$x$, 104$x$ and 101$x$ that may be accessed or received from locations 121XA, 121XB, 121XC, 121XD and 121XE respectively. Modified computation subset 122YA contains data elements 106$y$, 105$y$, 103$y$, 104$y$ and 101$y$ that may be accessed or received from locations 121YA, 121YB, 121YC, 121YD and 121YE respectively. Modified computation subset 122XB contains data elements 106$x$, 105$x$, 103$x$, 104$x$, 101$x$ and 102$x$ that may be accessed or received from locations 121XA, 121XB, 121XC, 121XD, 121XE and 121XF respectively. Modified computation subset 122YB contains data elements 106$y$, 105$y$, 103$y$, 104$y$, 101$y$ and 102$y$ that may be accessed or received from locations 121YA, 121YB, 121YC, 121YD, 121YE and 121YF respectively.

Referring to FIG. 1G, computing system architecture 100G also includes covariance calculation module 191 and covariance 192. Once p (p=v≥1) components of a covariance are incrementally calculated by component calculation module 131, covariance calculation module 191 may calculate sample covariance 192 and/or population covariance 193 as needed using one or more incrementally calculated or initialized components.

Figure 1H:
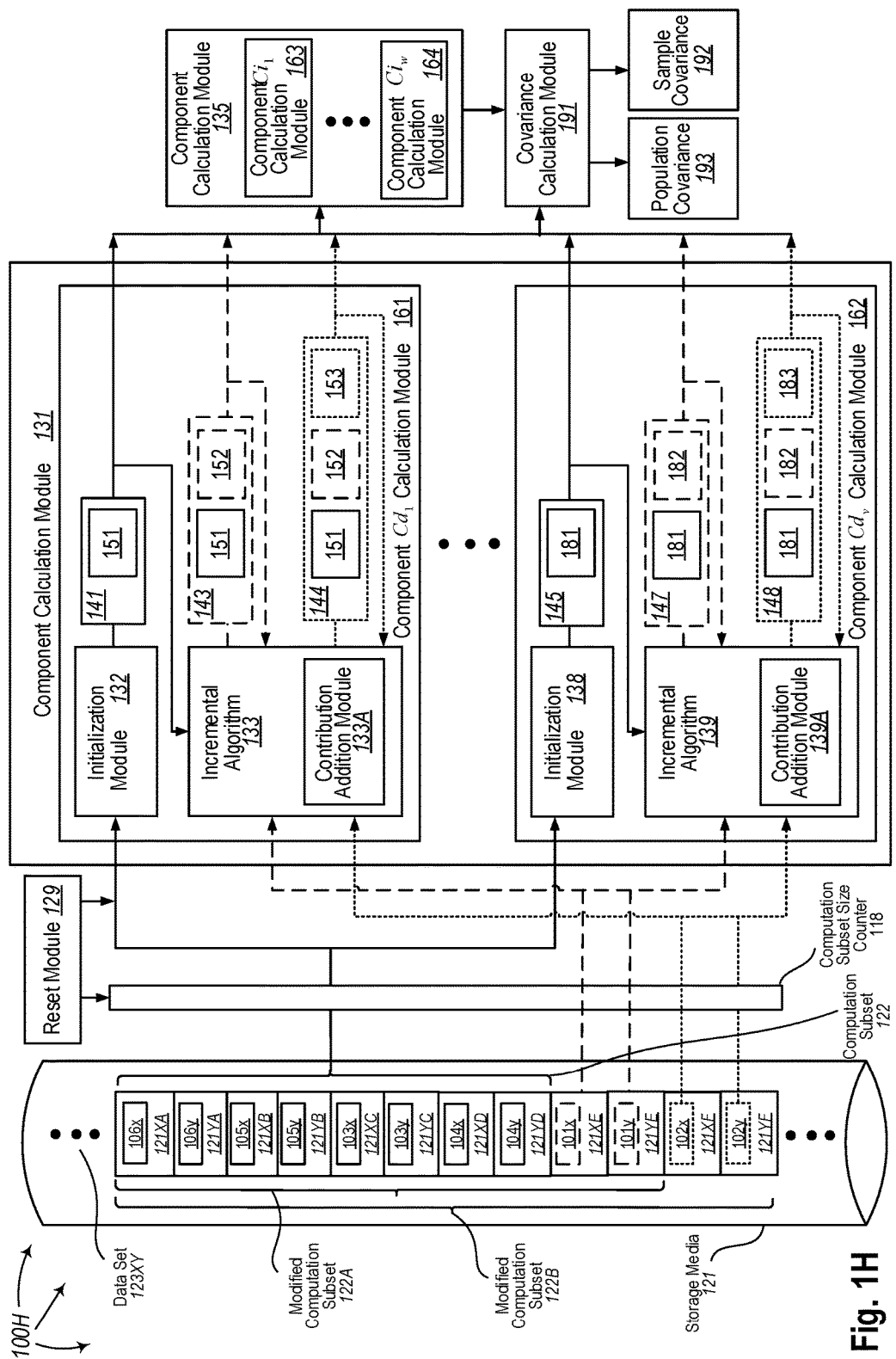
FIG. 1H illustrates an example computing system architecture that facilitates incrementally calculating covariance for Big Data with a single input where data elements from two Big Data sets are interleaved with some components being directly incrementally calculated and some components being indirectly incrementally calculated.
Figure 1H:
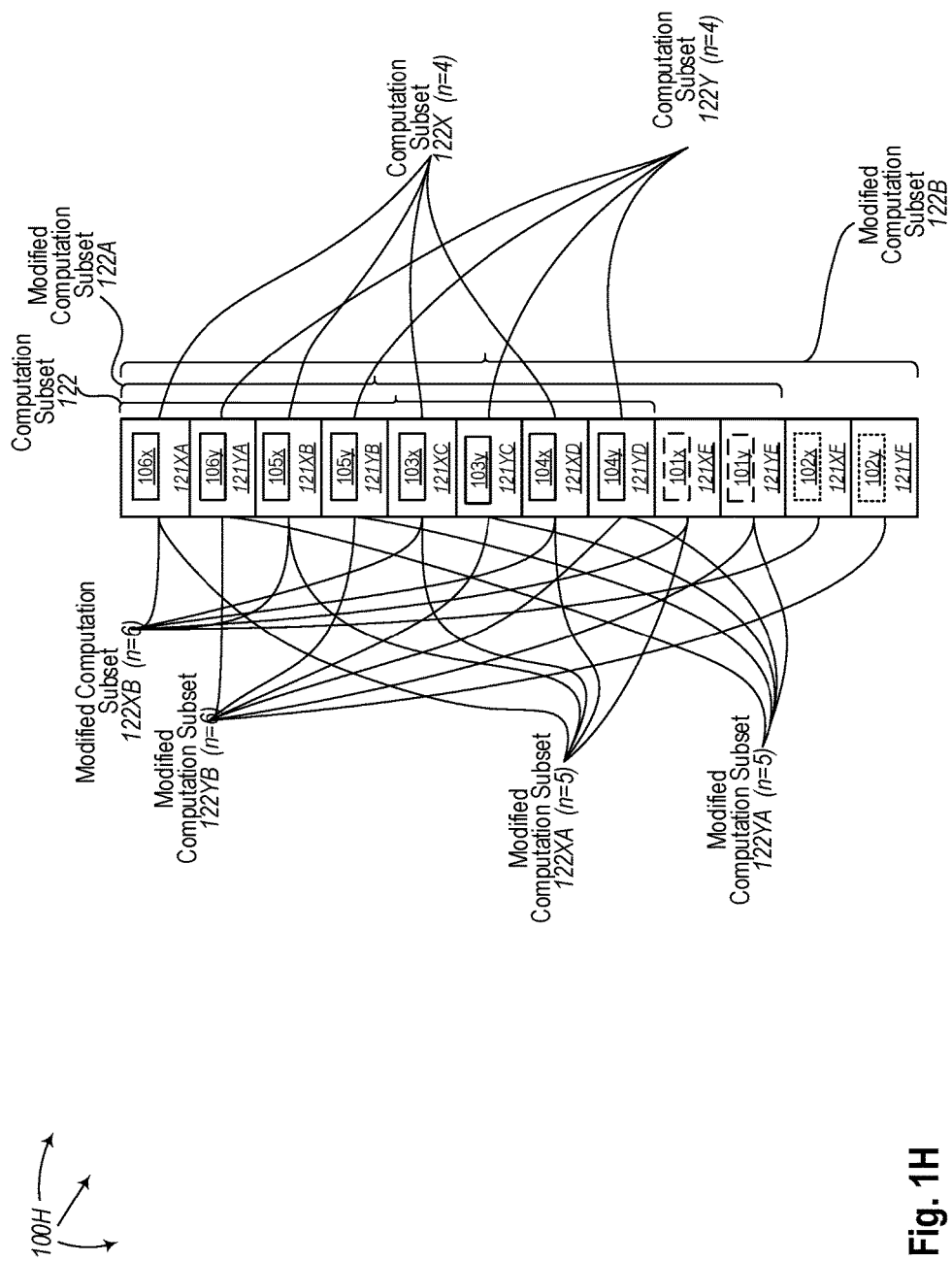

FIG. 1H illustrates an example computing system architecture 100H that facilitates incrementally calculating a covariance for Big Data with a single input where data elements from two Big Data sets are interleaved with some (v(1≤v<p)) components being directly incrementally calculated and some (w(w=p−v)) components being indirectly incrementally calculated. In certain implementations, the difference between computing system architectures 100H and 100G may be that architecture 100H includes a component calculation module 135. All parts except component calculation module 135 in 100H work in a similar way as those parts with the same reference numbers in 100E and 100G. Instead of repeating what have already been explained in the descriptions about 100E and 100G respectively, only the different part is discussed here. Computing system architecture 100H also includes component calculation module 131, which also includes v component calculation modules for directly incrementally calculating v components, however the number v in 100H may not be the same number v as in 100G, because some directly incrementally calculated components in 100G are indirectly incrementally calculated in 100H. In 100G, v=p≥1, but in 100H, 1≤v<p. Referring to FIG. 1H, computing system architecture 100D includes component calculation module 135. Component calculation module 135 includes w=p−v component calculation modules for indirectly incrementally calculating w components. Indirectly incrementally calculating w components includes indirectly incrementally calculating each of the w components one by one. Indirectly incrementally calculating a component includes accessing and using one or more components other than the component itself. The one or more components may have been initialized, directly incrementally calculated or indirectly incrementally calculated.

Referring to computing system architecture 100H, once all p (p=v+w) components have been incrementally calculated, covariance calculation module 191 may be used for calculating sample covariance 192 and/or population covariance 193 as needed based on one or more incrementally calculated or initialized components.

Figure 2:
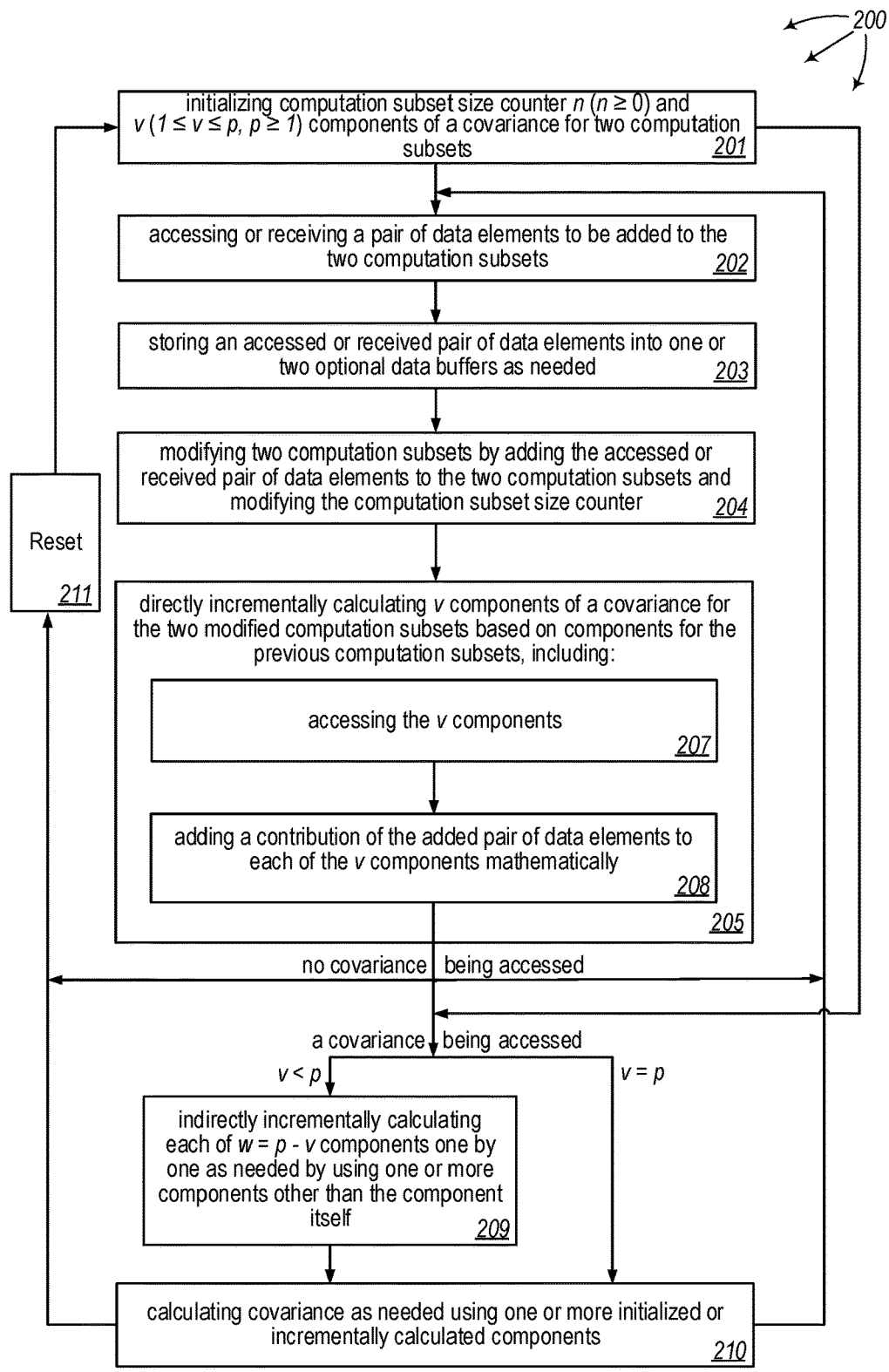
FIG. 2 illustrates a flow chart of an example method for incrementally calculating covariance for Big Data or streamed data.

FIG. 2 illustrates a flow chart of an example method 200 for incrementally calculating covariance for Big Data or streamed data. Method 200 will be described with respect to the components and data of computing system architectures 100A, 100B, 100C, 100D, 100E, 100F, 100G and 100H respectively.

Method 200 includes initializing computation subset size counter 118 and v(1≤v≤p, p≥1) components of a covariance for two computation subsets each of size n (201). For example, reset module 129 may set initial values for components ranging from component $Cd_1$ to component $Cd_v$ which may be accessed by initialization modules 132 and 138 respectively and corresponding initial value for computation subset size counter 118. Initialization module 132 may access the initial value for component $Cd_1$ and initialize component $Cd_1$ 141 with the value which becomes contribution 151. Similarly, initialization module 138 may access the initial value for component $Cd_v$ and initialize component $Cd_v$ 145 with the value which becomes contribution 181.

Method 200 includes accessing or receiving a pair of data elements to be added to the two computation subsets (202). For example, a pair of data elements (101$x$, 101$y$) may be accessed or received.

Method 200 includes storing the accessed or received pair of data elements into one or two optional data buffers as needed (203). Incremental covariance calculation algorithms do not need to store the accessed or received data element; however, when incremental covariance calculation combined with iterative covariance calculation, the accessed or received pair of data elements may need to be stored, so the accessed or received pair of data elements may be stored into one or two optional data buffers as needed. For example, referring to computing system architectures 100A and 100B, data elements 101$x$ may be stored into optional data buffer 125X and data element 101$y$ may be stored into optional data buffer 125Y, and referring to computing system architectures 100C and 100D, a pair of data elements (101$x$, 101$y$) may be stored into a single optional data buffer 125.

Method 200 includes modifying two computation subsets by adding the accessed or received pair of data elements to the two computation subsets and modifying the computation subset size counter (204). For incremental covariance calculation, modifying the two computation subsets may be reflected by modifying the computation subset size counter. For example, computation subset size counter 118 may be modified by increasing its current value by 1 upon accessing or receiving the pair of data elements (101$x$, 101$y$).

Method 200 includes directly calculating v(1≤v≤p) components of a covariance for the two modified computation subsets based on the v components for previous two computation subsets (205). For example, algorithm 133 may be used for directly incrementally calculating component $Cd_1$ 143 based on component $Cd_1$ 141 and the pair of data elements (101x, 101y), and algorithm 139 may be used for directly incrementally calculating component $Cd_v$ 147 based on component $Cd_v$ 145 and the pair of data elements (101x, 101y).

Directly incrementally calculating one or more components of a covariance for the two modified computation subsets includes accessing the v components of the covariance for the previous computation subsets (207). For example, incremental algorithm 133 may access component $Cd_1$ 141, and incremental algorithm 139 may access component $Cd_v$ 145.

Directly incrementally calculating v components of a covariance includes adding a contribution of the added pair of data elements to each of the v components mathematically (208). For example, incrementally calculating component $Cd_1$ 143 may include contribution addition module 133A adding contribution 152 to component $Cd_1$ 141 mathematically, and incrementally calculating component $Cd_v$ 147 may include contribution addition module 139A adding contribution 182 to component $Cd_v$ 145 mathematically. Contribution 152 and 182 are contributions of the pair of data elements (101x, 101y).

As depicted in FIG. 1A, component $Cd_1$ 143 includes contribution 151 and contribution 152, and component $Cd_v$ 147 includes contribution 181 and contribution 182. Contribution 151 is a contribution from initialization. Contribution 152 is a contribution from the pair of data elements (101x, 101y). Contribution 181 is a contribution from initialization. Contribution 182 is a contribution from the pair of data elements (101x, 101y).

Besides directly incrementally calculated components, some components may be indirectly incrementally calculated. Method 200 includes indirectly incrementally calculating each of w=p−v components one by one as needed based on one or more components other than the component itself (209) when v<p, i.e., not all components are directly incrementally calculated. Since the w indirectly incrementally calculated components are calculated using other components, they might not need to be initialized. In addition, the w indirectly incrementally calculated components might not need to be calculated in every iteration (i.e., when a data is added to the computation subset). They only need to be calculated when a covariance is accessed to save computation time. For example, referring to FIG. 1B where some components are directly incrementally calculated and some are indirectly incrementally calculated, calculation module 163 may indirectly incrementally calculate $Ci_1$ based on one or more components other than $Ci_1$, and calculation module 164 may indirectly incrementally calculate $Ci_w$ based on one or more components other than $Ci_w$. The one or more components may have been initialized, directly incrementally calculated or indirectly incrementally calculated. For a given component, it may be directly incrementally calculated in one algorithm but indirectly incrementally calculated in another algorithm. For example, referring to FIG. 4C, in Example Incremental Covariance Calculation Algorithm 1, component $Cov_s(X, Y)_{k+1}$ for the k+1$^{th}$ iteration is directly incrementally calculated based on component $Cov_s(X, Y)_k$ for the k$^{th}$ iteration and other components and the data elements added to the two computation subsets. However, referring to FIG. 4E, in Incremental Algorithm 3, component $Cov_s(X, Y)_{k+1}$ for the k+1$^{th}$ iteration is indirectly incrementally calculated based on components other than $Cov_s(X, Y)$. For a given algorithm, directly incrementally calculated components must be calculated whenever a data element is added to the computation subset, no matter if a covariance is accessed or not; However, an indirectly incrementally component only needs to be calculated as needed, i.e., when a covariance is accessed. For example, referring to FIG. 4E, in Incremental Algorithm 3, component $Cov_s(X, Y)_{k+1}$ only needs to be calculated when sample covariance $Cov_s(X, Y)_{k+1}$ is accessed.

Method 200 includes calculating a covariance as needed using one or more incrementally calculated components of the covariance (210). For example, covariance calculation module 191 may calculate sample covariance 192 and/or population covariance 193 based on one or more incrementally calculated components, e.g., component $Cd_1$ 143 and component $Cd_v$ 147.

202-208 may be repeated as additional data elements are accessed or received. 209-210 may be repeated as needed. For example, subsequent to calculating components ranging from $Cd_1$ 143 to $Cd_v$ 147, a pair of data elements (102x, 102y) may be accessed or received.

Incremental algorithm 133 may be used for directly incrementally calculating component $Cd_1$ 144 based on component $Cd_1$ 143. Incremental algorithm 133 may access component $Cd_1$ 143. Incrementally calculating component $Cd_1$ 144 may include contribution addition module 133A adding contribution 153 to component $Cd_1$ 143 mathematically. Contribution 153 is a contribution from the pair of data elements (102x, 102y). Similarly, incremental algorithm 139 may be used for directly incrementally calculating component $Cd_v$ 148 based on component $Cd_v$ 147. Incremental algorithm 139 may access component $Cd_v$ 147. Incrementally calculating component $Cd_v$ 148 may include contribution addition module 139A adding contribution 183 to component $Cd_v$ 147 mathematically. Contribution 183 is a contribution from the pair of data elements (102x, 102y). As depicted, component $Cd_1$ 144 includes contribution 151 (a contribution from initialization), contribution 152 (a contribution from the pair of data elements (101x, 101y)), and contribution 153 (a contribution from the pair of data elements (102x, 102y)), and component $Cd_v$ 148 includes contribution 181 (a contribution from initialization), contribution 182 (a contribution from the pair of data elements (101x, 101y)), and contribution 183 (a contribution from the pair of data elements (102x, 102y)). When a next pair of data elements to be added to the two computation subsets is accessed or received, component $Cd_1$ 144 may be used to incrementally calculate a component $Cd_1$ for the two modified computation subsets and component $Cd_v$ 148 may be used to incrementally calculate a component $Cd_v$ for the two modified computation subsets.

As depicted in FIG. 2, reset 211 may be used for resetting incremental covariance calculation. When reset 211 is invoked either after 205 or 210, the computation subset size counter and v(1≤v≤p) components of a covariance will be reset or initialized. For example, component $Cd_1$ 141 may be initialized as zero when the computation subset size counter is reset to zero or a specific value if the value has already been calculated when the computation subset size counter is non-zero. The latter case may happen when combining incremental covariance calculation with iterative covariance calculation or decremental covariance calculation. Component $Cd_v$ 145 may be initialized in the same way.

Figure 3A:
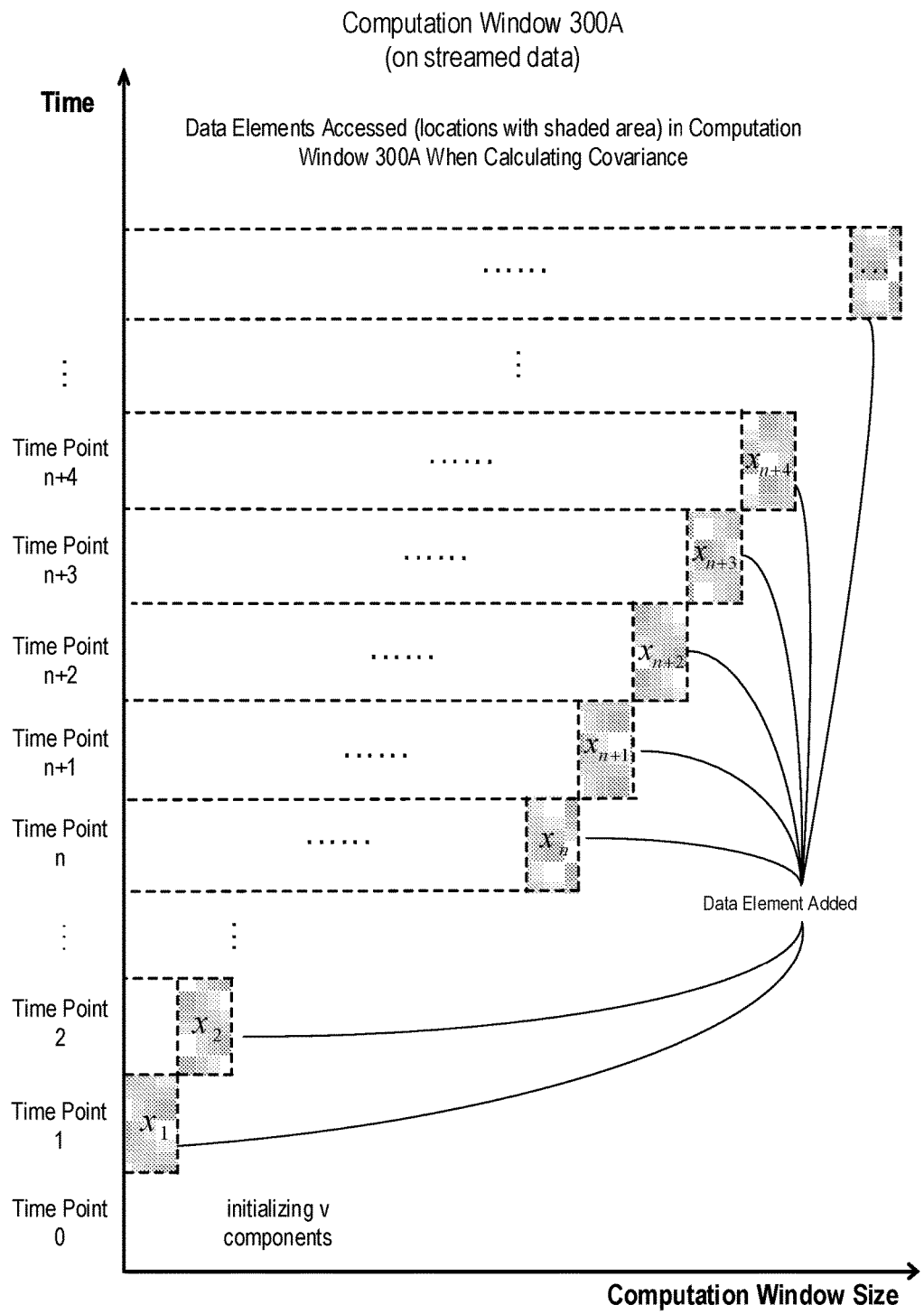
FIG. 3A illustrates data elements that are accessed from one of the two computation windows for incrementally calculating a covariance on streamed data. Data elements in the other computation window are accessed in a similar way.

FIG. 3A illustrates data elements that are accessed from, one of the two computation windows, 300A for incrementally calculating a covariance on streamed data. Data elements in the other computation window are accessed in a similar way, so only one computation window is depicted. The difference between a computation window and a computation subset is that the data elements in a computation window are ordered (e.g., a data element is always added to either the right end or the left end of a computation window). For example, referring to FIG. 3A, a newly accessed or received data element is always added to the right end of computation window 300A. Computation window 300A may be either empty from very beginning or non-empty where $v (1 \le v \le p)$ components have already been calculated. As time progresses, a data element, for example, data element $x_1$, then $x_2$, then $x_3$, ..., then $x_n$, $x_{n+1}$, ... is added to the computation window and accessed respectively for incrementally calculating v components of a covariance for the two modified computation windows, indirectly incrementally calculating w=p−v components, and calculating the covariance using one or more incrementally calculated components. The v components may be directly incrementally calculated based on the added data element and the v components for the previous computation window, and other data elements in computation window 300A are not touched. For a given incremental algorithm, v is a constant, so the number of operations for directly incrementally calculating v components is a constant, and the number of operations for indirectly incrementally calculating w=p−v components is also a constant. Thus, the computation workload for calculating p components for a given computation window with size n is reduced and a covariance may be calculated based on one or more incrementally calculated components. The larger the n, the more substantial the reduction in computation workload.

Figure 3B:
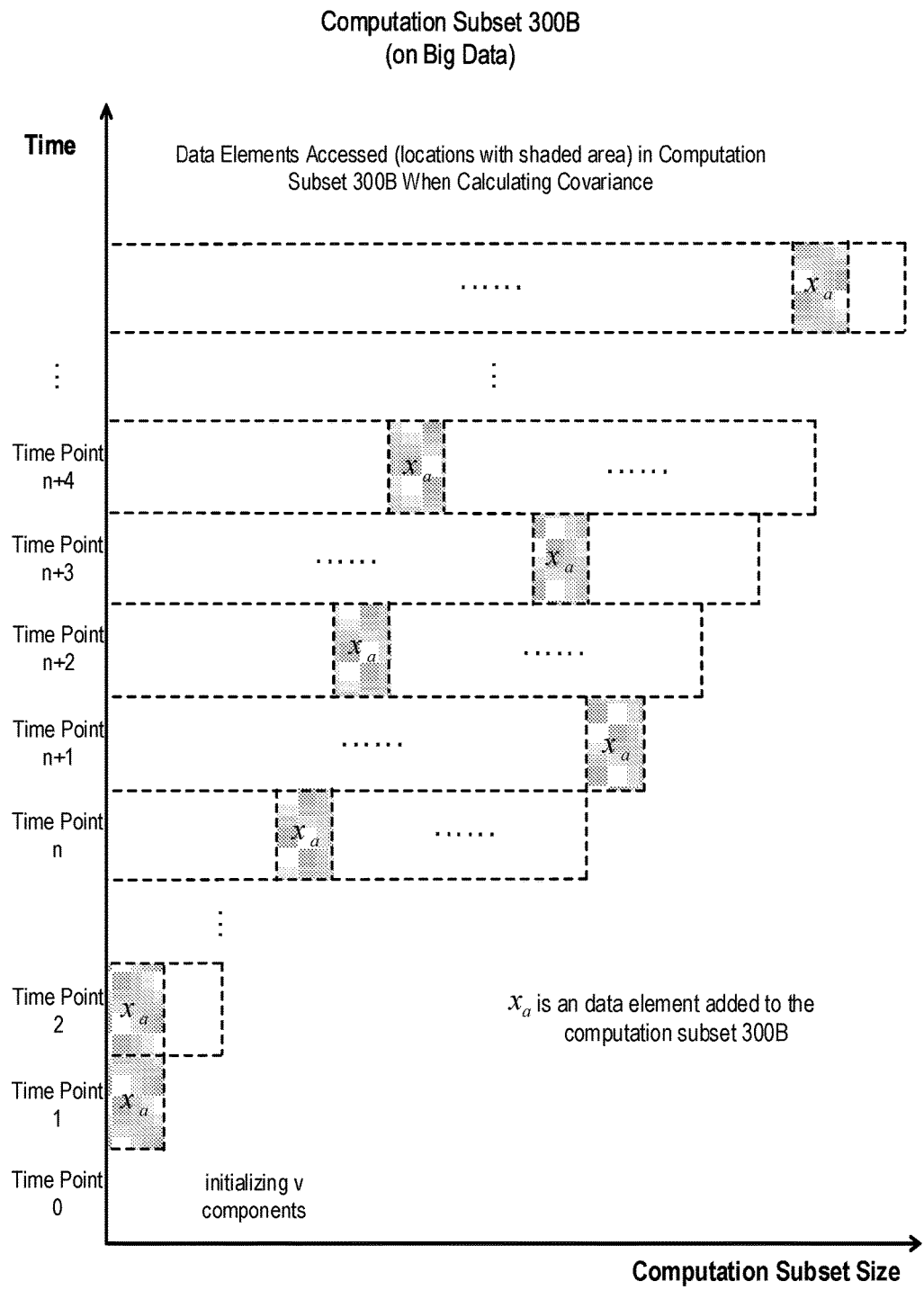
FIG. 3B illustrates data elements that are accessed from one of the two computation subsets for incrementally calculating a covariance on Big Data. Data elements in the other computation subset are accessed in a similar way.

FIG. 3B illustrates data elements that are accessed from, one of the two computation subsets, 300B for incrementally calculating a covariance on Big Data. Data elements in the other computation subset are accessed in a similar way, so only one computation subset is depicted. The difference between a computation subset and a computation window is that the data elements in a computation subset are not ordered (e.g., a data element may be added to any position of a computation subset). For example, referring to FIG. 3B, a newly accessed or received data element may be added to any position of computation subset 300B. Computation subset 300B may be either empty from very beginning or non-empty where $v (1 \le v \le p)$ components have already been calculated. As time progresses, data elements, for example, data element $x_a$, is added to the computation subset at the position indicated by shaded area and accessed respectively for incrementally calculating v components of a covariance for the modified computation subset, indirectly incrementally calculating w=p−v components, and calculating the covariance using one or more incrementally calculated components. The v components may be directly incrementally calculated using the added data element and the v components for the previous computation subset, and other data elements in computation subset 300B are not touched. For a given incremental algorithm, v is a constant, so the number of operations for directly incrementally calculating v components is a constant, and the number of operations for indirectly incrementally calculating w=p−v components is also a constant. Thus, the computation workload for calculating p components for a given computation subset with size n is reduced and a covariance may be calculated using one or more incrementally calculated components. The larger the n, the more substantial the reduction in computation workload.

A few examples of components of a covariance and example incremental covariance algorithms may be found in the following sections.

Suppose a computation subset X composed of n data elements: $X=\{x_i|i=1, ..., n\}$ and a computation subset Y composed of n data elements: $Y=\{y_i|i=1, ..., n\}$. Suppose both X and Y have changed after some time period, for example, a data element $x_a$ is added to computation subset X and a data element $y_a$ is added to computation subset Y respectively. Whenever a data element is added to a computation subset, the computation subset is considered as a modified computation subset. A new iteration of calculation is started each time any component of a covariance is recalculated due to a data change in the computation subsets.

FIG. 4A illustrates the definition of covariance. Suppose a computation subset $X=\{x_i|i=1, ..., n\}$ is a subset of a Big Data set or streamed data which contains the data elements to be involved in covariance calculation. Suppose a computation subset $Y=\{y_i|i=1, ..., n\}$ is a subset of a Big Data set or streamed data which contains the data elements to be involved in covariance calculation. Equation 401 is a traditional equation for calculating a sum of all the data elements in X for the first computation subset $XS_k$. Equation 402 is a traditional equation for calculating a sum of all the data elements in Y for the first computation subset $YS_k$. Equation 403 is a traditional equation for calculating a mean $\bar{x}_k$ of all the data elements in X. Equation 404 is a traditional equation for calculating a mean $\bar{y}_k$ of all the data elements in Y. Equation 405 is a traditional equation for calculating a sample covariance of X and Y for the first computation subset. Equation 406 is a traditional equation for calculating a population covariance of X and Y for the first two computation subsets.

Assuming the computation subset X of size n is changed with a data element $x_a$ being added. The size of modified computation subset X becomes n+1. Assuming the computation subset Y of size n is changed with a data element $y_a$ being added. The size of modified computation subset Y becomes n+1. Equation 407 may be used for incrementally calculating a sum $XS_{k+1}$ of all the data elements in modified computation subset X. Equation 408 may be used for incrementally calculating a sum $YS_{k+1}$ of all the data elements in modified computation subset Y. Equation 409 may be used for incrementally calculating a mean $\bar{x}_{k+1}$ of all the data elements in modified computation subset X. Equation 410 may be used for incrementally calculating a mean $\bar{y}_{k+1}$ of all the data elements in modified computation subset Y. Equation 411 may be used for incrementally calculating a sample covariance $Cov_s(X, Y)_{k+1}$ of the modified computation subsets X and Y. Equation 412 may be used for incrementally calculating a population covariance $Cov_p(X, Y)_{k+1}$ of the modified computation subsets X and Y.

FIG. 4B illustrates some example components of a covariance and basic incremental component calculation equations. A component of a covariance is a quantity or expression appearing in the covariance's definition equations or any transforms of the equations. The following are a few examples of components of a covariance.

$$XS_k = \sum_1^n x_i$$

$$YS_k = \sum_1^n y_i$$

-continued $$\bar{x}_k = \frac{XS_k}{n} = \frac{1}{n}\sum_1^n x_i$$

$$\bar{y}_k = \frac{YS_k}{n} = \frac{1}{n}\sum_1^n y$$

$$SXY_k = \sum_1^n x_i y_i$$

$$SDXY_k = \sum_1^n (x_i - \bar{x}_k)(y_i - \bar{y}_k)$$

$$\text{Cov}_S(X, Y)_k = \frac{1}{n-1}\sum_1^n (x_i - \bar{x}_k)(y_i - \bar{y}_k) \text{ for a sample covariance}$$

$$\text{Cov}_P(X, Y)_k = \frac{1}{n}\sum_1^n (x_i - \bar{x}_k)(y_i - \bar{y}_k) \text{ for a population covariance}$$

$SDXY_k$, $\bar{x}_k$, and $\bar{y}_k$ are components of a covariance because they directly appear in the definition of a covariance. $SXY_k$, $XS_k$ and $YS_k$ are also components of a covariance because they appear in a transform expression of a covariance. Even the sample covariance $$\text{Cov}_S(X, Y)_k = \frac{1}{n-1}\sum_1^n (x_i - \bar{x}_k)(y_i - \bar{y}_k)$$

itself is considered as a component because it is the largest single component appearing in the definition of a sample covariance. Similarly, $$\text{Cov}_P(X, Y)_k = \frac{1}{n}\sum_1^n (x_i - \bar{x}_k)(y_i - \bar{y}_k)$$

is also a component of a population covariance. A covariance may be calculated based on one or more its components or combinations of them. For example, if $$SDXY_k = \sum_1^n (x_i - \bar{x}_k)(y_i - \bar{y}_k)$$

is known, either a sample covariance or a population covariance may be calculated. If each required component may be incrementally calculated, then a covariance may be incrementally calculated. The number of components to be used varies depending on a specific incremental covariance calculation algorithm chosen. Since multiple components of a covariance and even more combinations of the components exist, there are multiple ways (algorithms) supporting incremental covariance calculation. To illustrate how to use components to incrementally calculate covariance, three different incremental covariance calculation algorithms are presented as examples later. A new iteration of calculation is started each time any component of a covariance is recalculated due to a data change in the computation subset which causes a computation subset to change to a modified computation subset. A sum or a mean is the basic component to be used for calculating a covariance. Equation 413 may be used for incrementally calculating a sum $XS_{k+1}$ of all the data elements in the modified computation subset X. Equation 414 may be used for incrementally calculating a sum $YS_{k+1}$ of all the data elements in the modified computation subset Y. Equation 415 may be used for incrementally calculating a mean $\bar{x}_{k+1}$ of all the data elements in the modified computation subset X. Equation 416 may be used for incrementally calculating a mean $\bar{y}_{k+1}$ of all the data elements in the modified computation subset Y. Either a sum $XS_{k+1}$ or a sum $YS_{k+1}$ and a mean $\bar{x}_{k+1}$ or a mean $\bar{y}_{k+1}$ will be used in all three incremental covariance calculation algorithms described later.

FIG. 4C illustrates the first example incremental covariance calculation algorithm (incremental algorithm 1) for incrementally calculating a sample covariance and a population covariance based on incrementally calculated covariance components $XS_{k+1}$ or $\bar{x}_{k+1}$, $YS_{k+1}$ or $\bar{y}_{k+1}$, and $SXY_{k+1}$. Equation 413 and equation 414 may be used for directly incrementally calculating a sum $XS_{k+1}$ and a sum $YS_{k+1}$ for the $k+1^{th}$ iteration based on a sum $XS_k$ and a sum $YS_k$ known for the $k^{th}$ iteration respectively. Equation 415 and equation 416 may be used for directly incrementally calculating a mean $\bar{x}_{+1}$ and a mean $\bar{y}_{k+1}$ for the $k+1^{th}$ iteration based on a mean $\bar{x}_k$ and a mean $\bar{y}_k$ known for the $k^{th}$ iteration respectively. Equation 417 is a traditional equation for calculating $SXY_k$ in the computation subsets X and Y. Equation 418 is a traditional equation for calculating $SXY_{k+1}$ in the modified computation subsets X and Y. Equation 419 may be used for directly incrementally calculating $SXY_{k+1}$ in the modified computation subsets X and Y if $SXY_k$ is available. Equation 420 may be used for directly incrementally calculate a sample covariance. Equation 421 may be used for directly incrementally calculate population covariance.

FIG. 4D illustrates the second example incremental covariance calculation algorithm (incremental algorithm 2) for incrementally calculating a sample covariance and population covariance based on incrementally calculated covariance components $XS_k$ or $\bar{x}_k$, $YS_k$ or $\bar{y}_k$, and $SDXY_{k+1}$. Equation 422 is a traditional equation for calculating component $SDXY_k$ in the computation subsets X and Y. Equation 423 is a traditional equation for calculating component $SDXY_{k+1}$ in the modified computation subsets X and Y. Equations 424 may be used for directly incrementally calculating $SDXY_{k+1}$ in the modified computation subset X and Y if components $YS_k$, or $\bar{y}_k$, $XS_k$ or $\bar{x}_k$ and $SDXY_k$ are available. Equations 424 comprise multiple equations but only one of them is needed depending on if a sum or a mean or both are available. Equations 424 add a contribution of a pair of data elements ($x_a$, $y_a$) to component $SDXY_k$ mathematically to get modified component $SDXY_{k+1}$. Equation 425 may be then used for indirectly incrementally calculating a sample covariance if component $SDXY_{k+1}$ is available. Equation 426 may be used for indirectly incrementally calculating a population covariance if component $SDXY_{k+1}$ is available.

FIG. 4E illustrates the third example incremental covariance calculation algorithm (incremental algorithm 3) for incrementally calculating a sample covariance and a population covariance based on incrementally calculated covariance components $XS_{k+1}$ or $\bar{x}_{k+1}$, $YS_{k+1}$ or $\bar{y}_{k+1}$, and $SXY_{k+1}$. Equation 413 and equation 414 may be used for directly incrementally calculating a sum $XS_{k+1}$ and a sum $YS_{k+1}$ for the $k+1^{th}$ iteration based on a sum $XS_k$ and a sum $YS_k$ known for the $k^{th}$ iteration respectively. Equation 415 and equation 416 may be used for directly incrementally calculating a mean $\bar{x}_{k+1}$ and a mean $\bar{y}_{k+1}$ for the $k+1^{th}$ iteration based on a mean $\bar{x}_k$ and a mean $\bar{y}_k$ known for the $k^{th}$ iteration respectively. Equation 427 is a traditional equation for calculating component $SXY_k$. Equation 428 is a traditional equation for calculating component $SXY_{k+1}$. Equation 429 may be used for directly incrementally calculating component $SXY_{k+1}$ if component $SXY_k$ is available. Equations 430 may be used for indirectly incrementally calculating a sample covariance $Cov_s(X, Y)_{k+1}$ if components $XS_{k+1}$ or $\bar{x}_{k+1}$, $YS_{k+1}$ or $\bar{y}_{k+1}$ and $SXY_{k+1}$ are available. Equations 430 comprise multiple equations but only one of them is needed depending on if a sum or a mean or both are available. Equations 430 add a contribution of a pair of data elements $(x_a, y_a)$ to component $Cov_s(X, Y)_k$ mathematically to get modified component $Cov_s(X, Y)_{k+1}$. Equations 431 may be used for indirectly incrementally calculating a population covariance $Cov_p(X, Y)_{k+1}$ if components $XS_{k+1}$ or $\bar{x}_{k+1}$, $YS_{k+1}$ or $\bar{y}_{k+1}$ and $SXY_{k+1}$ are available. Equations 431 comprise multiple equations but only one of them is needed depending on if a sum or a mean or both are available. Equations 431 add a contribution of a pair of data elements $(x_a, y_a)$ to component $Cov_p(X, Y)_k$ mathematically to get modified component $Cov_p(X, Y)_{k+1}$.

To demonstrate incremental covariance calculation algorithms and their comparison against traditional algorithms, three examples are given below. Three pairs of computation subsets of data elements are used. For traditional algorithms, the calculations for all three pairs of computation subsets are exactly the same. For incremental algorithms, initialization of one or more components is performed for the first pair of computation subsets, and incremental calculations are performed for the second and third pairs of computation subsets.

FIG. 5A illustrates an example of calculating a sample covariance on X Big Data Set 501 and Y Big Data Set 502 using traditional algorithms. X Big Data Set 501 and Y Big Data Set 502 are either a Big Data set or streamed data. X computation subset 503 includes 4 data elements in X Big Data Set 501. Y computation subset 505 includes 4 data elements in Y Big Data Set 502. X computation subset size 504 ($n$) is 4. Y computation subset size 506 ($n$) is 4. Use equation 403 to calculate $\bar{x}_1$ and equation 404 to calculate $\bar{y}_1$, then use equation 405 to calculate $Cov_s(X, Y)_1$. There are a total of 3 divisions, 4 multiplications, 9 additions and 9 subtractions when calculating the sample covariance on 4 data elements without any optimization.

The same equations may be used to calculate the sample covariance for X computation subset 507 and Y computation subset 509 as shown in FIG. 5A Cont'd 1, however the X computation subset size 508 and Y computation subset size 510 are both increased to 5. The calculation includes a total of 3 divisions, 5 multiplications, 12 additions, and 11 subtractions when calculating the sample covariance on 5 data elements without any optimization.

The same equations may be used to calculate the sample covariance for X computation subset 511 and Y computation subset 513 as shown in FIG. 5A Cont'd 2. The X computation subset size 512 and Y computation subset size 514 are both increased to 6. The calculation includes a total of 3 divisions, 6 multiplications, 15 additions, and 13 subtractions when calculating the sample covariance on 6 data elements without any optimization. Traditional algorithms for calculating sample covariance on n data elements typically take 3 divisions, n multiplications, 3(n−1) additions, and 2n+1 subtractions without any optimization.

FIG. 5B illustrates an example of calculating a sample covariance using incremental covariance algorithm 1. The calculations for X computation subset 503 and Y computation subset 505 use traditional equations to calculate the initial values of the components $\bar{x}_1$, $\bar{y}_1$ and $SXY_1$. In practice, such calculation will not happen, because incremental sample covariance calculation would either start from computation subsets X and Y are empty or where those components have already been calculated when both the X computation subset and the Y computation subset are not empty. Using traditional algorithms to calculate those components on these non-empty computation subsets X and Y here are only for the purpose of illustrating the incremental sample covariance calculation algorithm. The sample covariance of X computation subsets 503 and Y computation subset 505 are then calculated based on those components. There are a total of 3 divisions, 9 multiplications, 12 additions and 9 subtractions when calculating the sample covariance without any optimizations.

However, for X computation subset 507 and Y computation subset 509, the components of the sample covariance may be incrementally calculated. The X computation subset size 508 and Y computation subset size 510 are increased to 5. Equations 415 may be used to incrementally calculate the mean $\bar{x}_2$ and equation 416 may be used to incrementally calculate the mean $\bar{y}_2$. Equation 419 may be used for incrementally calculating the component $SXY_2$ based on component $SXY_1$ previously calculated and adding a contribution of the added data element $x_a$ and $y_a$ mathematically. Equation 420 may be used for calculating the sample covariance $Cov_s(X, Y)_2$ based on the components $Cov_s(X, Y)_1$, $x_a$, $y_a$, $SXY_1$, $\bar{x}_1$, $\bar{y}_1$, $\bar{x}_2$ and $\bar{y}_2$. There are a total of operations include 5 divisions, 8 multiplications, 6 additions, and 4 subtractions for calculating the incremental sample covariance.

The same equations may also be used for incrementally calculating the components of sample covariance for X computation subset 511 and Y computation subset 513 from the components of sample covariance. The X computation subset size 512 and the Y computation subset size 514 are increased to 6. Although the computation subset size is increased, the number of operations performed by the incremental sample covariance calculation algorithm remains constant. There are still 5 divisions, 8 multiplications, 6 additions and 4 subtractions when incrementally calculating the components of sample covariance. As such, the number of operations used when incrementally calculating the sample covariance is (potentially substantially) less than when using traditional equations.

FIG. 5C illustrates an example of calculating a sample covariance using incremental algorithm 2. A mean instead of a sum is used in this example. The calculations for X computation subset 503 and Y computation subset 505 use traditional equations to calculate the initial values of components $\bar{x}_1$, $\bar{y}_1$ and $SDXY_1$ and then use $SDXY_1$ to calculate the sample covariance $Cov_s(X, Y)_1$. For example, equation 403 may be used for calculating the mean $\bar{x}_1$ of X computation subset. Equation 404 may be used for calculating the mean $\bar{y}_1$ of Y computation subset. Equation 422 may be used for calculating $SDXY_1$. Equation 425 may be used for calculating the sample covariance $Cov_s(X, Y)_1$ based on the component $SDXY_1$. There are a total of operations include 3 divisions, 4 multiplications, 9 additions, and 9 subtractions for calculating the sample covariance on 4 data elements without any optimization.

However, for X computation subset 507 and Y computation subset 509, the components of the sample covariance may be incrementally calculated. The X computation subset size 508 and Y computation subset size 510 are increased to 5. Equations 415 may be used to incrementally calculate the mean $\bar{x}_2$ and equation 416 may be used to incrementally calculate the mean $\bar{y}_2$. Equation 424 may be used for incrementally calculating the component $SDXY_2$ based on components $SDXY_1$, $\bar{x}_1$ and $\bar{y}_1$ previously calculated and adding a contribution of the added data elements $x_a$ and $y_a$ mathematically. Equation 425 may be used for calculating the sample covariance $Cov_s(X, Y)_2$ based on the component $SDXY_2$. There are a total of operations include 4 divisions, 4 multiplications, 4 additions, and 2 subtractions for calculating the incremental sample covariance.

The same equations may also be used for incrementally calculating the components of sample covariance for X computation subset 511 and Y computation subset 513 from the components of sample covariance. The X computation subset size 512 and the Y computation subset size 514 are increased to 6. Although the computation subset size is increased, the number of operations performed by the incremental sample covariance calculation algorithm remains constant. There are still 4 divisions, 4 multiplications, 4 additions and 2 subtractions when incrementally calculating the components of sample covariance. As such, the number of operations used when incrementally calculating the sample covariance is (potentially substantially) less than when using traditional equations.

FIG. 5D illustrates an example of calculating a sample covariance using incremental algorithm 3. A mean instead of a sum is used in this example. The calculations for X computation subset 503 and Y computation subset 505 use traditional equations to calculate the initial values of components $\bar{x}_1$, $\bar{y}_1$, and $SXY_1$ and then use $SXY_1$ to calculate the sample covariance $Cov_s(X, Y)_1$. For example, equation 403 may be used for calculating the mean $\bar{x}_1$ of X computation subset. Equation 404 may be used for calculating the mean $\bar{y}_1$ of Y computation subset. Equation 427 may be used for calculating $SXY_1$. Equation 430 may be used for calculating the sample covariance $Cov_s(X, Y)_1$ based on the components $SXY_1$, $\bar{x}_1$ and $\bar{y}_1$. There are a total of operations include 3 divisions, 6 multiplications, 9 additions, and 2 subtractions for calculating the sample covariance on 4 data elements without any optimization.

However, for X computation subset 507 and Y computation subset 509, the components of the sample covariance may be incrementally calculated. The X computation subset size 508 and Y computation subset size 510 are increased to 5. Equations 415 may be used to incrementally calculate the mean $\bar{x}_2$ and equation 416 may be used to incrementally calculate the mean $\bar{y}_2$. Equation 429 may be used for incrementally calculating the component $SXY_2$ based on the components $SXY_1$ previously calculated and adding a contribution of the added data elements $x_a$ and $y_a$ mathematically. Equation 430 may be used for calculating the sample covariance $Cov_s(X, Y)_2$ based on the components $SXY_2$, $\bar{x}_2$ and $\bar{y}_2$. There are a total of operations include 3 divisions, 5 multiplications, 4 additions, and 1 subtraction for calculating the incremental sample covariance.

The same equations may also be used for incrementally calculating the components of sample covariance for X computation subset 511 and Y computation subset 513 from the components of sample covariance. The X computation subset size 512 and the Y computation subset size 514 are increased to 6. Although the computation subset size is increased, the number of operations performed by the incremental sample covariance calculation algorithm remains constant. There are still 3 divisions, 5 multiplications, 4 additions and 1 subtraction when incrementally calculating the components of sample covariance. As such, the number of operations used when incrementally calculating the sample covariance is (potentially substantially) less than when using traditional equations.

Examples in FIGS. 5A-5D use two inputs. A covariance calculation with a single input may be performed in similar ways.

Three examples of incrementally calculating sample covariance using three different incremental covariance algorithms are depicted in FIG. 5B, FIG. 5C and FIG. 5D. Similar calculations for population covariance may also be demonstrated.

FIG. 6 illustrates computational loads for traditional sample covariance algorithm and incremental sample covariance algorithms for n=6. As depicted, there are fewer multiplication operations, fewer addition operations, and fewer subtraction operations using any one of the incremental algorithms.

FIG. 7 illustrates computational loads for traditional sample covariance algorithm and incremental sample covariance algorithms for n=1,000,000. As depicted, there are substantially fewer multiplication operations, fewer addition operations, and fewer subtraction operations using any one of the incremental algorithms.

Similar differences in computational loads may be demonstrated for population covariance as well.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for generating a covariance for data elements in two modified computation subsets, the method comprising:

initializing, by a computing-device-based computing system, a sum or an average or both for each of two pre-modified computation subsets of one or two data sets on at least one of one or more storage media or one or two data streams accessible by the computing-device-based computing system, one or more other components of a covariance for the two pre-modified computation subsets, and a computation subset size counter n (n≥10) which specifies a number of data elements in each of the two pre-modified computation subsets;

accessing or receiving, by the computing-device-based computing system, a pair of data elements to be added to the two pre-modified computation subsets;

modifying, by the processor-based computing system, the two pre-modified computation subsets by:
adding the accessed or received pair of data elements to the two pre-modified computation subsets; and
modifying the computation subset size counter;

incrementally deriving, by the computing-device-based computing system, a sum or an average or both for each of the two modified computation subsets;

directly incrementally deriving, by the computing-device-based computing system and based at least in part on the one or more components of the covariance other than a sum and an average initialized or derived for the two pre-modified computation subsets, one or more components of a covariance other than a sum and an average for the two modified computation subsets, wherein the incrementally deriving includes:
accessing the one or more components of the covariance other than a sum and an average for the two pre-modified computation subsets without accessing all data elements in the two modified computation subsets to reduce data accessing latency thereby saving computing resources and reducing the computing-device-based computing system's power consumption; and adding any contribution of the added pair of data elements to each of the accessed components mathematically without using all data elements in the two modified computation subsets in order to reduce the number of operations performed by the computing-device-based computing system thereby increasing calculation efficiency; and generating, by the computing-device-based computing system, a covariance for the two modified computation subsets based on one or more of the incrementally derived components.

2. The computing-system-implemented method of claim 1, wherein the generating a covariance further comprises indirectly incrementally deriving, by the computing-device-based computing system, one or more components of the covariance for the two modified computation subsets, wherein the indirectly incrementally deriving the one or more components includes individually calculating each respective one of the one or more components based on one or more components other than the respective one component.

3. The computing-system-implemented method claim 1, wherein the generating a covariance for the two modified computation subsets comprises calculating either a sample covariance or a population covariance for the two modified computation subsets based on one or more of the incrementally derived components for the two modified computation subsets.

4. The computing-system-implemented method of claim 1, wherein incrementally deriving one or more components of a covariance for the two modified computation subsets comprises incrementally calculating a component $$\sum_{1}^{n}(x_i - \bar{x}_{k+1})(y_i - \bar{y}_{k+1}) + (x_a - \bar{x}_{k+1})(y_a - \bar{y}_{k+1})$$

for the two modified computation subsets by adding any contribution of the added pair of data elements to a component $$\sum_{1}^{n}(x_i - \bar{x}_k)(y_i - \bar{y}_k)$$

initialized or derived for the two pre-modified computation subsets mathematically.

5. The computing-system-implemented method of claim 1, wherein accessing or receiving a pair of data elements includes accessing or receiving a plurality of z pairs of data elements to be added to the two pre-modified computation subsets, and wherein the method further comprises performing, for each of the respective z pairs of data elements, the modifying the two pre-modified computation subsets, the incrementally deriving a sum or an average or both for each of the two modified computation subsets, the directly incrementally deriving the one or more components of a covariance other than a sum and an average for the two modified computation subsets, and the generating a covariance for the two modified computation subsets.

6. The computing-system-implemented method of claim 1, wherein accessing or receiving a pair of data elements to be added to the two pre-modified computation subsets comprises accessing or receiving a plurallity of z pairs of data elements to be added to thetwo pre-modified computation subsets, and wherein the method further comprises performing, for each of the respective z pairs of data elements, the modifying the two pre-modified computation subsets, the incrementally deriving a sum or an average or both for each of the two modified computation subsets, and the directly incrementally deriving the one or more components of a covariance other than a sum and an average for the two modified computation subsets.

7. A computing system, the computing system comprising:
one or more computing devices;
each computing device comprising one or more processors;
one or more storage media; and
one or more calculation modules that, when executed by at least one of the one or more computing devices, determine a covariance for two modified computation subsets, the one or more calculation modules configured to:
a. initialize a sum or an average or both for each of two pre-modified computation subsets of one or two data sets on at least one of the one or more storage media or one or two data streams accessible by the computing system, and one or more other components of a covariance for the two pre-modified computation subsets, and a computation subset size counter n (n≥10) which specifies a number of data elements in each of the two pre-modified computation subsets;
b. access or receive a pair of data elements to be added to the two pre-modified computation subsets;
c. modify the two pre-modified computation subsets by adding the accessed or received pair of data elements to the two pre-modified computation subsets and modifying the computation subset size counter;
d. incrementally calculate a sum or an average or both for each of the two modified computation subsets;
e. directly incrementally calculate one or more components of a covariance other than a sum and an average for the modified two computation subsets based at least in part on the one or more components of the covariance other than a sum and an average for the two pre-modified computation subsets, wherein incremental calculation of the one or more components includes to add any contribution of the added pair of data elements to each of the one or more components mathematically without accessing and using all data elements in the two modified computation subsets to reduce data access latency and the number of operations performed by the computing system, thereby increasing calculation efficiency, saving computing resources and reducing the computing system's power consumption; and
f. generate a covariance for the two modified computation subsets based on one or more of the incrementally calculated components.

8. The computing system of claim 7, wherein the generating a covariance for the two modified computation subsets further comprises indirectly incrementally calculate one or more components of a covariance for the two modified computation subsets, wherein indirectly incrementally calculating one or more components includes individually calculating each respective one of the one or more components based on one or more components other than the respective one component.

9. The computing system of claim 7, wherein the covariance calculation module being configured to calculate the covariance using the one or more components comprises the covariance calculation module being configured to calculate either a sample covariance or a population covariance using the one or more components.

10. The computing system of claim 7, wherein the one or more calculation modules that, when executed by at least one of the one or more computing devices, performing b, c, d, e, and f multiple times.

11. The computing system of claim 7, wherein the one or more calculation modules that, when executed by at least one of the one or more computing devices, performing b, c, d, and e multiple times.

12. A computing system program product for use at a configured computing system that comprises one or more computing devices and one or more storage media, each computing device comprising one or more processors, the computing system program product comprising one or more non-transitory computing-device-readable storage media having stored thereon computing-device-executable instructions that, when executed by at least one of the one or more computing devices in the configured computing system, cause the configured computing system to perform a method for generating a covariance for data elements in two modified computation subsets, the method including steps to:
  initialize, by a configured computing system, a computation subset size counter n (n≥10), a sum or an average or both for each of two pre-modified computation subsets of one or two data sets on at least one of one or more storage media on the configured computing system or one or two data streams accessible by the configured computing system, and one or more other components of a covariance for the two pre-modified computation subsets each of size n;
  access or receive, by the configured computing system, a pair of data elements to be added to the two pre-modified computation subsets;
  modify, by the configured computing system, the two pre-modified computation subsets via adding the to-be-added pair of data elements to the two pre-modified computation subsets and modifying the computation subset size counter;
  incrementally calculate, by the configured computing system, a sum or an average or both for each of the two modified computation subsets;
  directly incrementally calculate, by the configured computing system and based on the one or more components of the covariance other than a sum and an average initialized or calculated for the two pre-modified computation subsets, one or more components of a covariance other than a sum and an average for the two modified computation subsets, including to:
    access the one or more components initialized or calculated for the two pre-modified computation subsets without accessing all data elements in the two modified computation subsets to reduce data accessing latency thereby saving computing resources and reducing the configured computing system's power consumption; and
    add any contribution of the added pair of data elements to each of the accessed components mathematically without using all data elements in the two modified computation subsets in order to reduce the number of operations performed by the configured computing system thereby increasing calculation efficiency; and
  generate, by the configured computing system, a covariance for the two modified computation subsets based on one or more of the incrementally calculated components.

13. The computing system program product of claim 12, wherein the generating a covariance for the two modified computation subsets comprises generating a sample covariance or a population covariance based on one or more of the incrementally calculated components.

14. The computing system program product of claim 12, wherein the computing-device-executable instructions that, when executed, further cause the configured computing system to access or receive a pair of data elements to be added to the two pre-modified computation subsets, to modify the two pre-modified computation subsets, to incrementally calculate a sum or an average or both for each of the two modified computation subsets, to directly incrementally calculate the one or more components, and to generate a covariance for the two modified computation subsets for each pair of multiple pairs of data elements to be accessed or received.

15. The computing system program product of claim 14, wherein the generating a covariance for the two modified computation subsets comprises generating a covariance for two modified computation subsets only when the covariance is accessed.

16. The computing-system-implemented method of claim 5, wherein the generating a covariance for the two modified computation subsets comprises generating a covariance for two modified computation subsets only when the covariance is accessed.

17. The computing-system-implemented method of claim 16, wherein the generating a covariance for the two modified computation subsets further comprises indirectly incrementally deriving, by the computing-device-based computing system, one or more components of the covariance for the two modified computation subsets, wherein the indirectly incrementally deriving the one or more components includes individually calculating each respective one of the one or more components based on one or more components other than the respective one component.

18. The computing system of claim 10, wherein the performing f comprises generating a covariance for two modified computation subsets only when the covariance is accessed.

19. The computing system of claim 18, wherein the performing f comprises indirectly incrementally calculating one or more components of the covariance for the two modified computation subsets, wherein indirectly incrementally calculating one or more components includes individually calculating each respective one of the one or more components based on one or more components other than the respective one component.

20. The computing system program product of claim 15, wherein the generating a covariance for the two modified computation subsets comprises indirectly incrementally calculating, by the configured computing system, one or more components of the covariance for the two modified computation subsets, wherein indirectly incrementally calculating the one or more components includes individually calculating each respective one of the one or more components based on one or more components other than the respective one component.

* * * * *